(12) United States Patent
Yano

(10) Patent No.: US 9,830,537 B2
(45) Date of Patent: Nov. 28, 2017

(54) IMAGE FORMING APPARATUS

(71) Applicant: CANON KABUSHIKI KAISHA, Tokyo (JP)

(72) Inventor: Yuzuru Yano, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/677,031

(22) Filed: Apr. 2, 2015

(65) Prior Publication Data
US 2015/0286909 A1 Oct. 8, 2015

(30) Foreign Application Priority Data

Apr. 4, 2014 (JP) .................................. 2014-077523

(51) Int. Cl.
*G06K 15/02* (2006.01)
*G06K 15/12* (2006.01)
*H04N 1/191* (2006.01)

(52) U.S. Cl.
CPC ..... *G06K 15/1242* (2013.01); *G06K 15/1898* (2013.01); *H04N 1/191* (2013.01); *G06K 15/1894* (2013.01)

(58) Field of Classification Search
None
See application file for complete search history.

(56) References Cited

U.S. PATENT DOCUMENTS

| | | | | | |
|---|---|---|---|---|---|
| 4,985,930 A | * | 1/1991 | Takeda | ................. | G06K 9/3283 358/452 |
| 5,068,905 A | * | 11/1991 | Hackett | ................. | G06T 3/4023 345/698 |
| 5,101,448 A | * | 3/1992 | Kawachiya | ........... | G06F 17/243 358/464 |
| 5,162,838 A | * | 11/1992 | Inuzuka | ............... | H04N 1/0057 358/401 |
| 5,191,430 A | * | 3/1993 | Sudoh | .................... | G06K 15/02 358/1.16 |
| 5,359,267 A | * | 10/1994 | Wilber | ................... | H04N 3/233 315/397 |

(Continued)

OTHER PUBLICATIONS

Yuzuru Yano, U.S. Appl. No. 14/676,043, filed Apr. 1, 2015.

*Primary Examiner* — Ted Barnes
(74) *Attorney, Agent, or Firm* — Fitzpatrick, Cella, Harper & Scinto

(57) ABSTRACT

An image forming apparatus can inhibit occurrence of defective images caused when a buffer consumption amount in sector correction exceeds a previously estimated capacity. The image forming apparatus comprises a line buffer for temporarily storing image data. The image forming apparatus performs correction processing of the image data to correct distortion of the image to store the corrected image data in the line buffer. Further, the image forming apparatus forms images on a recording medium based on the image data having experienced the correction processing. The CPU of the image forming apparatus determines whether a size of the image data having experienced the distortion correction by a first correction value based on a sector correction seed value exceeds the number of lines in the line buffer. If it is determined that it exceeds the number of lines, the CPU obtains a second correction value, correcting the first value.

9 Claims, 19 Drawing Sheets

(56) References Cited

U.S. PATENT DOCUMENTS

| | | | | |
|---|---|---|---|---|
| 5,491,769 A * | 2/1996 | Moller | G06T 3/4023 | 345/670 |
| 5,494,360 A * | 2/1996 | Watanabe | G06F 17/212 | 345/663 |
| 5,677,776 A * | 10/1997 | Matsuda | H04N 1/38 | 355/25 |
| 5,686,960 A * | 11/1997 | Sussman | G02B 26/106 | 348/218.1 |
| 5,698,953 A * | 12/1997 | Shim | H04N 3/233 | 315/371 |
| 5,831,658 A * | 11/1998 | Iga | G06K 15/02 | 347/171 |
| 5,933,247 A * | 8/1999 | Shibata | H04N 1/32363 | 358/404 |
| 6,002,380 A * | 12/1999 | Lee | G09G 1/04 | 315/371 |
| 6,091,426 A * | 7/2000 | Hauck | G06T 3/4023 | 345/24 |
| 6,094,510 A * | 7/2000 | Yaguchi | G06T 9/004 | 382/166 |
| 6,106,095 A * | 8/2000 | Jackson | B41J 2/2135 | 347/19 |
| 6,238,105 B1 * | 5/2001 | Pardo | G06K 15/12 | 358/1.15 |
| 6,339,434 B1 * | 1/2002 | West | G06T 3/4023 | 345/667 |
| 6,360,029 B1 * | 3/2002 | Moller | G06T 3/4023 | 345/671 |
| 6,430,320 B1 * | 8/2002 | Jia | G06K 9/32 | 382/289 |
| 6,567,559 B1 * | 5/2003 | Easwar | H04N 1/41 | 358/1.15 |
| 6,606,415 B1 * | 8/2003 | Rao | G06T 9/00 | 382/228 |
| 6,738,154 B1 * | 5/2004 | Venable | G06K 9/32 | 358/1.15 |
| 7,124,094 B1 * | 10/2006 | Kobayashi | G06Q 20/382 | 705/27.2 |
| 7,420,719 B2 * | 9/2008 | Mongeon | H04N 1/00002 | 358/406 |
| 7,548,326 B2 * | 6/2009 | Fukushima | H04N 1/00002 | 347/116 |
| 8,717,639 B2 * | 5/2014 | Arakawa | H04N 1/04 | 347/116 |
| 9,245,318 B2 * | 1/2016 | Palanivel | G06T 3/60 | |
| 9,258,454 B2 * | 2/2016 | Donovan | H04N 1/00002 | |
| 2001/0014183 A1 * | 8/2001 | Sansom-Wai | G06K 9/32 | 382/289 |
| 2001/0040699 A1 * | 11/2001 | Osawa | G06K 15/00 | 358/1.17 |
| 2002/0067492 A1 * | 6/2002 | Ueda | G06F 3/12 | 358/1.9 |
| 2004/0222941 A1 * | 11/2004 | Wong | G06F 3/1431 | 345/1.1 |
| 2006/0008161 A1 * | 1/2006 | Kaithakapuzha | H04N 19/91 | 382/233 |
| 2006/0023047 A1 * | 2/2006 | Green | B41J 2/17503 | 347/104 |
| 2006/0087664 A1 * | 4/2006 | Pozuelo | B41J 13/0009 | 358/1.5 |
| 2006/0132618 A1 * | 6/2006 | Fujita | H04N 1/2112 | 348/222.1 |
| 2006/0268308 A1 * | 11/2006 | Suzuki | B41J 2/47 | 358/1.13 |
| 2007/0064267 A1 * | 3/2007 | Murakata | G06K 9/3208 | 358/1.15 |
| 2007/0097434 A1 * | 5/2007 | Tao | G06F 3/1208 | 358/1.16 |
| 2007/0139715 A1 * | 6/2007 | Kazama | H04N 1/3878 | 358/3.07 |
| 2008/0187216 A1 * | 8/2008 | Hasegawa | H04N 1/4092 | 382/162 |
| 2009/0040561 A1 * | 2/2009 | Sasaki | H04N 1/387 | 358/1.18 |
| 2009/0067732 A1 * | 3/2009 | Kaithakapuzha | H04N 19/91 | 382/233 |
| 2009/0257088 A1 * | 10/2009 | Tokashiki | G06K 15/00 | 358/1.15 |
| 2010/0017706 A1 * | 1/2010 | Wilczak, Jr. | G06F 17/211 | 715/244 |
| 2010/0060933 A1 * | 3/2010 | Ogura | H04N 1/0473 | 358/1.16 |
| 2010/0097623 A1 * | 4/2010 | Ooya | H04N 1/047 | 358/1.9 |
| 2010/0103441 A1 * | 4/2010 | Ooya | H04N 1/047 | 358/1.9 |
| 2010/0157386 A1 * | 6/2010 | Okumura | G06T 1/00 | 358/488 |
| 2010/0202708 A1 * | 8/2010 | Fukaya | H04N 1/41 | 382/246 |
| 2010/0309497 A1 * | 12/2010 | Oikawa | G06F 3/1204 | 358/1.9 |
| 2010/0309528 A1 * | 12/2010 | Nacman | H04N 1/40068 | 358/444 |
| 2011/0285726 A1 * | 11/2011 | Redmann | H04N 9/3102 | 345/467 |
| 2012/0062907 A1 * | 3/2012 | Tojima | H04N 1/3935 | 358/1.2 |
| 2012/0243005 A1 * | 9/2012 | Nakazawa | B41J 2/2146 | 358/1.2 |
| 2012/0287479 A1 * | 11/2012 | Takahashi | H04N 1/40 | 358/444 |
| 2013/0155428 A1 * | 6/2013 | Mizuno | G06K 15/02 | 358/1.9 |
| 2013/0162625 A1 * | 6/2013 | Schmit | G06T 3/40 | 345/419 |
| 2013/0195376 A1 * | 8/2013 | Baheti | G06K 9/00456 | 382/289 |
| 2013/0278945 A1 * | 10/2013 | Ono | G03G 15/041 | 358/1.2 |
| 2013/0335759 A1 * | 12/2013 | Hirose | G06K 15/1219 | 358/1.9 |
| 2015/0286901 A1 * | 10/2015 | Yano | G06K 15/1204 | 358/3.24 |
| 2015/0286906 A1 * | 10/2015 | Murakami | H04N 1/393 | 358/1.2 |

\* cited by examiner

| MAIN SCANNING POSITION [pix] | 0~3 | 4~7 | 8~11 | 12~15 | 16~19 |
|---|---|---|---|---|---|
| CORRECTION VALUE [pix] | −2 | −1 | 0 | 1 | 2 |

FIG. 12

IMAGE FORMING APPARATUS

BACKGROUND OF THE INVENTION

Field of the Invention

The present disclosure relates to an image forming apparatus which forms an image by an electrostatic latent image.

Description of the Related Art

In image forming apparatuses such as color laser beam printers, digital copiers, and the like, the image is temporarily formed on an intermediate transfer member. The image formed on the intermediate transfer member is then transferred to a recording medium (for example, a sheet). Then, the image is printed. As the intermediate transfer member, for example, a belt which is formed into an endless shape is used. Transferring the image formed on the intermediate transfer member to a sheet is called a secondary transfer.

FIG. 14 is a diagram for explaining a secondary transfer mechanism. In FIG. 14, a driven roller 110 and a secondary transfer roller 112 are arranged to face each other. When a driving roller 108 rotates at a constant speed, the intermediate transfer belt 107 moves at a constant speed. A sheet S is conveyed along with a guide 131 by a conveyance roller 130 and the secondary roller 112, which rotate at a constant speed. Then, the secondary transfer is performed. In this case, the intermediate transfer belt 107 is designed to move at the same speed at which the sheet S is conveyed, which, however, is not always the case. In the following, a particular example is explained using FIG. 15.

FIG. 15A is a diagram for explaining an arrangement of the driven roller 110 and the secondary transfer roller 112 in a case where the intermediate transfer belt 107 moves at the same speed at which the sheet S is conveyed. In this example, a longitudinal direction of the column-shaped driven roller 110 is defined as a main scanning direction. A direction which is vertical to the main scanning direction is defined as a sub-scanning direction. The sub-scanning direction corresponds to a direction in which the sheet S is conveyed. In the arrangement shown in FIG. 15A, a rotary shaft 110z of the driven roller 110 is in parallel with a rotary shaft 112z of the secondary transfer roller 112. Therefore, pressure (nip pressure) of a portion where the driving roller 110 and the secondary transfer roller 112 contact (nip portion) is constant regardless of a position in the main scanning direction (main scanning position). Thereby, the sheet S is conveyed at the same speed at which the intermediate transfer belt 107 moves.

FIG. 15B is a diagram for explaining an arrangement of the driven roller 110 and the secondary transfer roller 112 in a case where the intermediate transfer belt 107 does not move at the same speed at which the sheet S is conveyed. In the arrangement shown in FIG. 15A, a rotary shaft 110z of the driven roller 110 is not in parallel with a rotary shaft 112z of the secondary transfer roller 112. Due to this, the nip pressure between the driven roller 110 and the secondary transfer roller 112 varies depending on the main scanning position. For example, in FIG. 15B, a main scanning position (x) is shown. The distance between the shafts of the driven roller 110 and the secondary transfer roller 112 at this position is longer than that in the arrangement shown in FIG. 15. Therefore, the nip pressure at the main scanning position (x) is relatively low. Further, in FIG. 15B, a main scanning position (y) is shown. The distance between the shafts of the driven roller 110 and the secondary transfer roller 112 at this position is shorter than that in the arrangement shown in FIG. 15. Therefore, the nip pressure at the main scanning position (y) is relatively high. As mentioned, if the nip pressure varies depending on the main scanning position, the pressure applied to the sheet S by the driven roller 110 and the secondary transfer roller 112 also differs according to the main scanning direction. Further, the higher the nip pressure is, the faster the sheet S is conveyed. Also, the lower the nip pressure is, the slower the sheet S is conveyed. This is because as the nip pressure is high, the frictional force to the sheet S also enhances, which enables easy transmission of the rotational force to the sheet S. Due to this, the conveyance speed of the sheet S varies depending on the main scanning position in the arrangement shown in FIG. 15B.

FIG. 15B shows a case where a print operation is performed in a state where the nip pressure differs at every main scanning position. In this case, as the sheet S passes through the nip portion, it is rotated with its locus being a sector of a circle. As a result, a deviation is caused in the secondary transfer. For example, when printing an image shown in FIG. 16A, as shown in FIG. 16B, the shape is printed in a distorted shape. Comparing the distortion to a sector of a circle, a position at low nip pressure at the main scanning position is an outer peripheral side of the sector. Also, a position at high nip pressure at the main scanning position is an inner peripheral side of the sector. In the following, such distortion is called a sector deformation. FIG. 16B shows a sheet having experienced the sector deformation, in which distortion amount b1 and distortion amount b2 at the main scanning positions respectively are about 0.1 [mm]. Further, the distortion amount b3 at a position of a sub-scanning direction (sub-scanning position) is about 0.5 [mm]. As above, the distortion amount b3 at the sub-scanning position is several times larger than the distortion amounts b1 and b2 at the main scanning positions. Due to this, the distortion of the sub-scanning direction caused by the sector deformation largely affects print image quality, which is a problem.

To this problem, an image forming apparatus as disclosed in US Patent Application Publication No. US2007/0139715 (A1) intends to realize correction processing to the sector deformation by image data conversion processing. In particular, by detecting an output image formed on a printed sheet, deformation parameter of the sector deformation is obtained. Based on the result as derived, in the following printing operation, image data is converted in advance to cancel the occurrence of the distortion caused by the sector deformation. This is to avoid the occurrence of any defective image caused by the sector deformation.

On the other hand, the image forming apparatus as disclosed in US Patent Application Publication No. US2007/0139715 (A1) leaves a problem. In particular, according to the degree of sector deformation, there may be a case where a sector correction parameter value (correction value) for cancelling the occurrence of distortion caused by the sector (or fan-shape) deformation exceeds the estimated value. In this case, the defective image occurs. In the following, description is given when the defective image occurs.

When performing a sector correction by converting the image data, memory capacity required for the correction processing is estimated and prepared in advance. Then, frame processing or band processing, which will be described later, is performed. First, description is given with regard to the occurrence of the defective image in an image forming apparatus which performs the frame processing. The image forming apparatus which performs the frame processing comprises a frame buffer which is capable of storing image data of one page used for image forming. A size of the frame buffer, however, is finite. Therefore, in the sector correction, if a magnification ratio in the sub-scanning direction is larger than that of the estimated magnification ratio, the image data after the sector correction may not be stored in the frame buffer. In this case, the defective image occurs. In the following, description is given with regard to a particular example using FIG. 17.

FIG. 17A is a diagram which schematically represents image data (original image data) which is input in the image forming apparatus. Viewed from front of FIG. 17A, a left side of the original image data in the sub-scanning direction is defined as a side a. Similarly, a right side of the original image data in the sub-scanning direction is defined as a side b. FIG. 17B is a diagram which schematically represents a frame buffer in which image data after the sector correction is stored. Compared with the original image data in FIG. 17A, the size of the frame buffer in the main scanning direction remains the same, while the size of the frame buffer in the sub-scanning direction is 2[%] larger. FIG. 17C is a diagram which schematically represents image data after the sector correction to the original image data. In FIG. 17C, the length of the side a in FIG. 17A is reduced by 3 [%], which is represented as a side a'. Also, the length of the side b is enlarged by 3[%], which is represented as a side b'.

FIG. 17D is a diagram which schematically represents a state where a part of the image data after the sector correction as shown in FIG. 17C is too large to be stored in the frame buffer. The size of the frame buffer in the sub-scanning direction is 2[%] larger than that of the original image data in the sub-scanning direction. However, the side b is enlarged by 3[%], which is represented by "side b". Therefore, an excess portion c, which is a part of the image data after the sector correction, is not stored in the frame buffer integrally with other parts of the image data after the sector correction. FIG. 17E is a diagram illustrating an enlarged excess portion c shown in FIG. 17D. The excess portion c is overwritten, for example, in an area that is irrelevant to the image data after the sector correction of the frame buffer. As a result, defective image occurs during printing.

Next, description is given with regard to the occurrence of the defective image in an image forming apparatus which performs the band processing. The image forming apparatus which performs the band processing comprises a small amount of band memory comprised of a few lines for image processing. In the band processing, a part of pixel lines of the image data comprising one page is stored in the band memory to effect the image processing. Therefore, in the band processing, it is not possible to perform processing which refers the image data not stored in the band memory. The number of lines referred in the sector correction depends on a difference between a max value and a minimum value of the length of the sides of the sector in the sub-scanning direction. For example, if the difference is large, the number of the lines to be referred is also increased. That is, if the number of lines to be referred during the sector correction processing process exceeds the number of lines which can be stored in the band memory, the defective image occurs during printing. In the following, a particular example is described using FIGS. 18 and 19.

FIG. 18 is a diagram showing image data (original image data) before the sector correction. The original image data shown in FIG. 18 is arranged with 12 pixels in the main scanning length and 10 pixels in the sub-scanning length. As mentioned, the image data is a set of pixels arranged in the main scanning direction and the sub-scanning direction. The original image data, comprising 12×10 pixels, is divided into three areas. A first area, defined as an area 0, is an area from a first to a fourth pixel (in the main scanning area, the same applies hereinafter.) A second area, defined as an area 1, is an area from a fifth to an eighth pixel. A third area, defined as area 2, is an area from a ninth to a twelfth pixel. Further, a magnification ratio in the sub-scanning direction is +25[%] (enlarged by 25[%]) in the area 0, 0[%] in the area 1, and −25[%] (reduced by 25[%])) in the area 2. That is, in the area 0, one line is inserted for every four lines and the size in the sub-scanning direction is enlarged by 25[%]. In the area 2, one line is removed for every four lines and the size in the sub-scanning direction is reduced by 25[%]. FIG. 19 shows the image data obtained after magnifying the image data in this manner.

For example, when scanning the pixel line of line d in FIG. 19, it is necessary to refer the image data of four lines in total, from a seventh line to a tenth line of the original image data. Therefore, a line buffer capable of storing the read image data of four lines in total is required. Otherwise, the line d cannot be scanned. Thus, when a shortage of the line buffer occurs, unexpected image data may be output, which causes the defective image in printing.

It is a main object of the present disclosure to provide an image forming apparatus which inhibits occurrence of defective image caused when buffer consumption amount in a sector correction exceeds a previously estimated capacity. Further, an image forming apparatus which is capable of optionally selecting, by a user, the correction processing method is provided.

SUMMARY OF THE INVENTION

An image forming apparatus according to the present disclosure includes a buffer configured to temporarily store image data; a correction unit configured to perform correction processing to the image data to correct distortion of an image to store the corrected image data in the buffer; an image forming unit configured to form an image on a recording medium based on the image data having experienced the correction processing; an obtaining unit configured to obtain a first correction condition to correct the distortion of the image; and a derivation unit configured to derive a second correction condition based on the first correction condition, wherein the second correction condition is derived, when a size of the image data having experienced the correction processing based on the first correction condition exceeds a predetermined size corresponding to a size of the buffer, such that size of the image having experienced the correction processing becomes smaller than the size of the buffer.

Further, the image forming apparatus according to another embodiment of the present disclosure includes: an image forming unit configured to form an image on an image bearing member; a transfer unit configured to transfer the image on the image bearing member to a conveyed recording medium; a buffer configured to store image data; a correction unit configured to perform a distortion correction using the image data stored in the buffer based on the correction condition, wherein the distortion correction is a correction in which the image is expanded or contracted in a first direction based on a correction condition, the condition is defined for a plurality of positions in a second direction, wherein the first direction is a direction of conveyance of the recording medium, and the second direction is a direction perpendicular to the first direction; and a calculation unit configured to determine whether to perform clip processing or not based on a first variation amount of a first position in the first direction, a second variation amount of a second position in the first direction and information relating to the capacity of the buffer, to calculate the correction condition for the plurality of positions based on the first variation amount and the second variation amount, in the case where it is determined not to perform the clip processing and to convert the first variation amount and the second variation amount based on the information to calculate the correction conditions for the plurality of positions based on the result of conversion in the case where it is determined that the clip processing is necessary.

Further features of the present invention will become apparent from the following description of exemplary embodiments (with reference to the attached drawings).

BRIEF DESCRIPTION OF THE DRAWINGS

FIG. 12 is a diagram illustrating an example of a sector correction parameter.

DESCRIPTION OF THE EMBODIMENTS

Here, description is given in a case where distortion of the image is caused by a sector distortion in a sub-scanning direction. In this case, the image forming apparatus corrects a sector correction parameter (correction condition of the sector correction) within a correctable range. In particular, description is given in a case where buffer consumption in a sector correction exceeds a previously estimated capacity. The correction processing is hereinafter referred to as clip processing. The clip processing includes various correction processing methods (correction pattern) according to the purpose of use of the printings after printing. In the following, an embodiment of an image forming apparatus, in which a user can select the clip processing method according to the purpose of use of the printings in the sector correction, is described in detail with reference to the drawings.

First Embodiment

Figure 1:
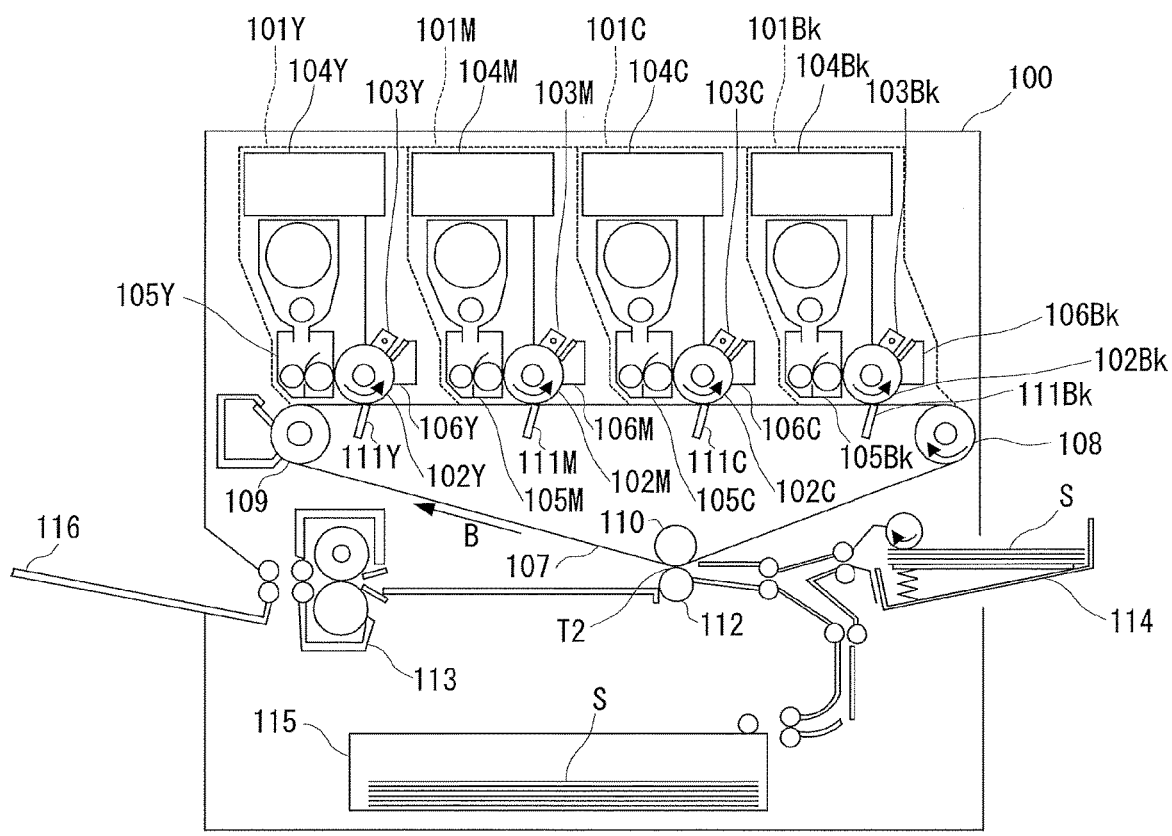
FIG. 1 is a schematic longitudinal cross-sectional view of an image forming apparatus.

In the present embodiment, description is given, for example, with regard to an image forming apparatus which performs the sector correction by the band processing. FIG. 1 is a schematic longitudinal sectional view of a digital full color printer (image forming apparatus) which forms the image using toners of a plurality of colors. Note that the printer may be of a monochromatic color (for example, black) type.

An image forming apparatus 100 comprises four image forming sections (image forming means) 101Y, 101M, 101C, and 101Bk, which form images of different colors. Here, the letters Y, M, C, and Bk respectively represent yellow, magenta, cyan, and black. The image forming sections 101Y, 101M, 101C and 101Bk respectively form images using yellow, magenta, cyan, and black toners.

The image forming sections 101Y, 101M, 101C, and 101Bk respectively comprise photosensitive drums 102Y, 102M, 102C, and 102Bk, which are photosensitive members. Also, charging devices 103Y, 103M, 103C, and 103Bk are respectively provided around the photosensitive drums 102Y, 102M, 102C, and 102Bk. Further, optical scanning devices 104Y, 104M, 104C, and 104Bk and developing devices 105Y, 105M, 105C, and 105Bk are respectively provided. Drum cleaning devices 106Y, 106M, 106C, and 106Bk are respectively provided around the photosensitive drums 102Y, 102M, 102C, and 102Bk.

Also, in the image forming apparatus 100, an intermediate transfer belt 107, which serves as an image bearing member, formed into an endless shape, is arranged below the photosensitive drums 102Y, 102M, 102C, and 102Bk. The intermediate transfer belt 107 is tensioned by a drive roller 108 and driven rollers 109 and 110. The intermediate transfer belt 107 rotates in a direction of an arrow B in FIG. 1 during the image formation. Further, primary transfer devices 111Y, 111M, 111C, and 111Bk are provided at positions opposing to the photosensitive drums 102Y, 102M, 102C, and 102Bk with the intermediate transfer belt 107 of an intermediate transfer member interposed therebetween. The image forming apparatus 100 further comprises a secondary transfer roller 112, which serves as a transfer unit, and a fixing device 113. The secondary transfer roller transfers the toner image formed on the intermediate transfer belt 107 to a sheet S, which is an example of a recording medium. The fixing device 113 fixes the toner image transferred on the sheet S (on the recording medium). Further, the image forming apparatus 100 comprises a manual feeding cassette 114, a feeding cassette 115 and a discharge part 116.

Here, a description is given with regard to an example of an image forming process, from a charging process to a development process, in the image forming apparatus 100. The image forming process performed in the respective image forming sections 101M, 101C, and 101Bk is identical to each other. Therefore, in the following, on behalf of others, the image forming process in the image forming section 101Y is described.

The charging device 103Y in the image forming section 101Y charges the photosensitive drum 102Y. The photosensitive drum 102Y is a drum which rotationally drives when a drive force from a driving motor (not shown) is transmitted thereto. The charged photosensitive drum 102Y (image carrier) is exposed by a laser light which is emitted from the optical scanning device 104Y. As a result, an electrostatic latent image is formed on a rotating photosensitive member. Thereafter, the electrostatic latent image is developed by the developing device 105Y as a yellow toner image. The detail of the optical scanning device 104Y is described later.

Next, an image forming process after a transfer process is described. The primary transfer devices 111Y, 111M, 111C and 111Bk apply transfer bias to the transfer belt. As a result, the toner images formed on the photosensitive drums 102Y, 102M, 102C, and 102Bk in each of the image forming sections are respectively transferred to the intermediate transfer belt 107 (primary transfer). Thus, the toner images of each color are sequentially overlapped on the intermediate transfer belt 107. The toner images of the four colors, which are transferred onto the intermediate transfer belt 107, are again transferred onto the sheet S which is conveyed from the manual feeding cassette 114 or the feeding cassette 115 to a secondary transfer section T2 (secondary transfer). Then, the toner images on the sheet S are heated and fixed by the fixing device 116. Thereafter, the sheet S is delivered to the delivery part 116. As a result, a full-color image is formed on the sheet S. Note that toner remaining on the respective photosensitive drums 102Y, 102M, 102C, and 102K, having finished the transfer, is removed by the drum cleaning devices 106Y, 106M, 106C, and 106Bk. Thereafter, the image forming process is continued.

Figure 2:
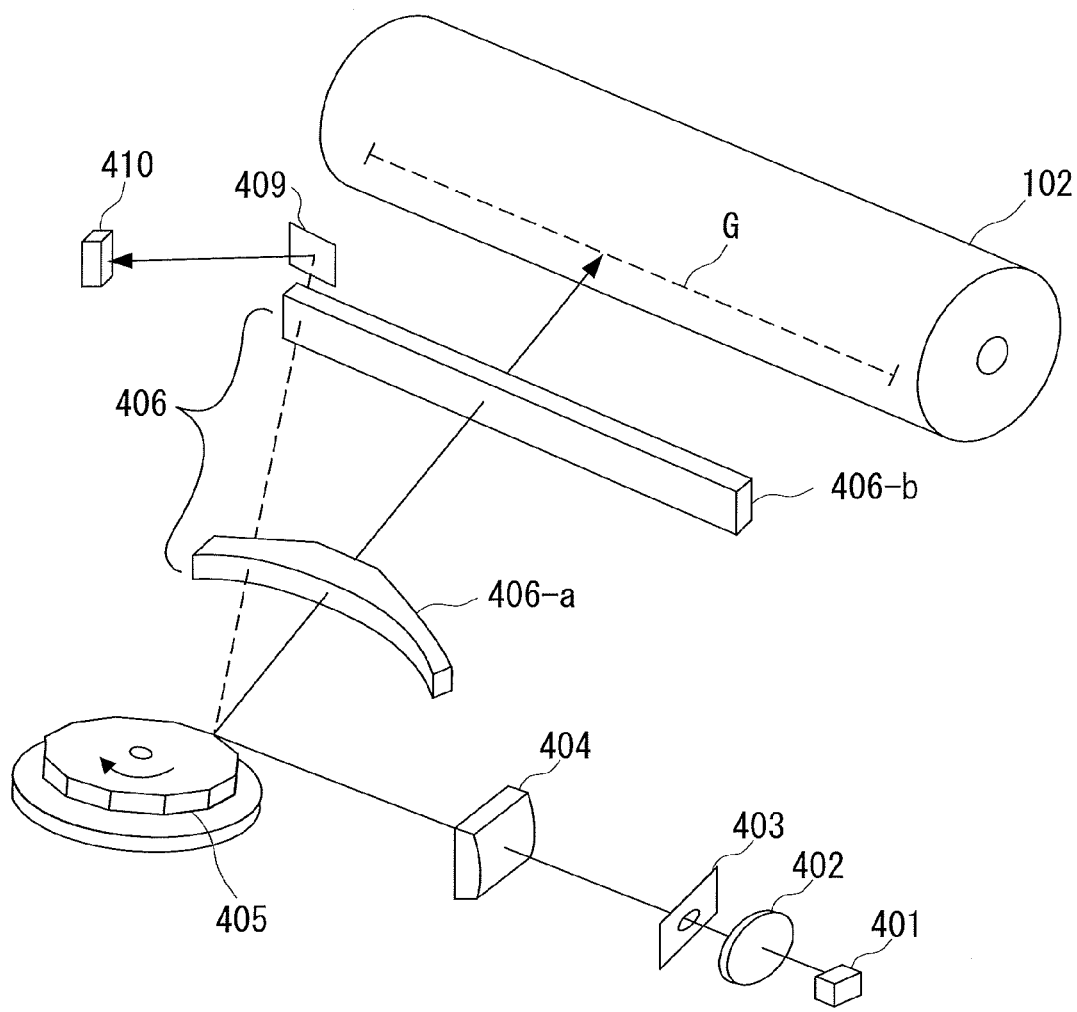
FIG. 2 is a diagram illustrating a configuration example of an optical scanning device.

FIG. 2 is a diagram illustrating a configuration example of an optical scanning device included in the image forming apparatus 100. The configuration of the optical scanning devices 104Y, 104M, 104C, and 104Bk is identical to each other so that the indexes of Y, M, C, and Bk, each representing a color, are omitted in the following description. The optical scanning device according to the present embodiment comprises a semiconductor laser 401, a collimator lens 402, a diaphragm 403, a cylindrical lens 404, a rotating polygon mirror (hereinafter referred to as polygon mirror) 405. The optical scanning device further comprises f-θ lens 406 (lens 406-a, lens 406-b), a reflector 409, and a beam detect sensor (hereinafter referred to as BD sensor) 410. The semiconductor laser 401 emits light beam based on a control signal from a sequence controller 411 (described later). The light beam emitted from the semiconductor laser 401 is turned into collimated beams to a center of an optical axis by passing through the collimator lens 402, the diaphragm 403, and the cylindrical lens 404. Then, the collimated beams enter a polygon mirror 405. The polygon mirror 405 rotates at constant angular speed by a driving force of a driving apparatus (not shown) in a direction of arrow shown in FIG. 2. The incident laser beam is turned into a deflected beam which continuously changes angles according to the rotation and is reflected. The light which is turned into the deflected beam is condensed by the f-θ lens 406 and scans on a surface of the photosensitive drum 102. The BD sensor 410 is provided at a position where the scanned light reflected by the reflector 409 enters. The BD sensor detects timing of the beams which scan by detecting timing at which the light enters.

Figure 3:
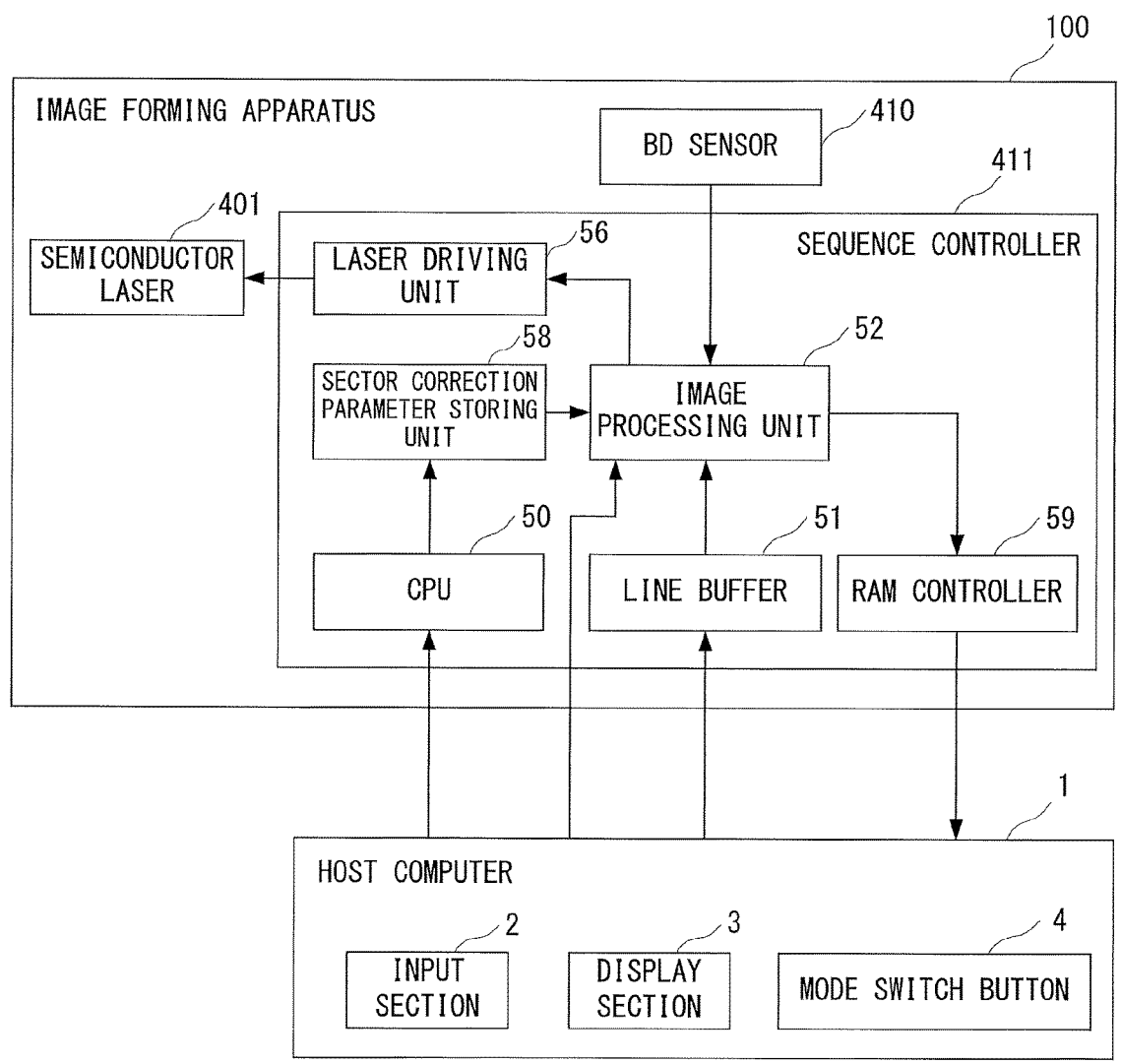
FIG. 3 is a diagram illustrating an example of functional block of sequence controller.

FIG. 3 is a diagram illustrating an example of functional block of the sequence controller of the image forming apparatus 100. The configuration of the sequence controller of each color is identical to each other so that the indexes of Y, M, C, and Bk, each representing a color, are omitted in the following description. Note that a host computer 1, as will be described later, is shared by each color.

A sequence controller 411 comprises a central processing unit (CPU) 50, a line buffer 51, an image processing unit 52, a laser driving unit 56, a sector correction parameter storing unit 58, and a RAM controller 59. The host computer 1 comprises an input section 2, a display section 3, and a mode switch button 4. The input section 2 receives an operation input from a user. The display section 3 displays various information to the user. The button 4 switches each function mode (described later). The sequence controller 411 has a function which outputs print data received from the host computer 1 to the semiconductor laser 401. Also, in the description, the number of lines in the line buffer is defined as "L".

The sequence controller 411 has three function modes, which are "print mode", "sector correction seed value input mode", and "clip processing input mode". Each functional mode is optionally switched by operating the mode switch button 4 in the host computer 1. The print mode is selected when, for example, forming images. The sector correction seed input mode is selected when a sector correction seed value (described later) is input. The clip processing input mode is selected when the correction pattern is set. This is a collection pattern used when further correcting the sector correction parameter derived based on the sector correction seed value.

The host computer 1 sends the sector correction seed value and the clip processing selection signal to the CPU 50. Further, the host computer 1 sends a sector correction ON/OFF signal to the image processing unit. Further, the host computer 1 outputs the image data of 1 line to the line buffer 51 every time the host computer receives an image request signal from the RAM controller 59. Note that the image data comprises of a set of pixels arranged in the main scanning direction and in the sub-scanning direction.

Based on the sector correction seed value and the clip processing selection signal received from the host computer 1, the CPU 50 derives the sector correction parameter (correction condition) to the entire image. Thereafter, the CPU 50 stores the result as derived in the sector correction parameter storing unit 58. Note that the sector correction parameter which is not clip-processed is defined as a first correction condition. Further, the sector correction parameter after the clip processing is defined as a second correction condition. The line buffer 51 temporarily stores the image data in, for example, a unit of pixel line. The line buffer 51 stores the image data of L line which is input from the host computer 1. Note that when the image of 1 line is input from the host computer 1, if this exceeds L line, data of one line which is the oldest is removed. In accordance with this, a new image of one line is written. The image processing unit 52 sequentially obtains the image data from the line buffer 51 in synchronization with a synchronization signal of the BD sensor 410. Thereafter, the image processing unit 52 outputs the data of one line to the laser driving unit 56. When the sector correction ON/OFF signal is ON, the image processing unit 52 performs image processing (sector correction processing) based on the sector correction parameter stored in the sector correction parameter storing unit 58. When the sector correction ON/OFF signal is OFF, the image processing unit 52 does not perform the sector correction processing. Further, after the data of one line is output to the laser driving unit 56, the image processing unit 52 outputs a transfer completion signal to the RAM controller 59.

The laser driving unit 56 converts the image data from the image processing unit 52 into a laser driving signal. The laser driving unit 56 outputs the laser driving signal to the semiconductor laser 401. When the image data of L line is not stored in the line buffer 51, the RAM controller 59 outputs the image request signal to the host computer 1. Further, if the transfer completion signal is received from the image processing unit 52, the RAM controller 59 outputs the image request signal to the host computer 1.

Figure 4:
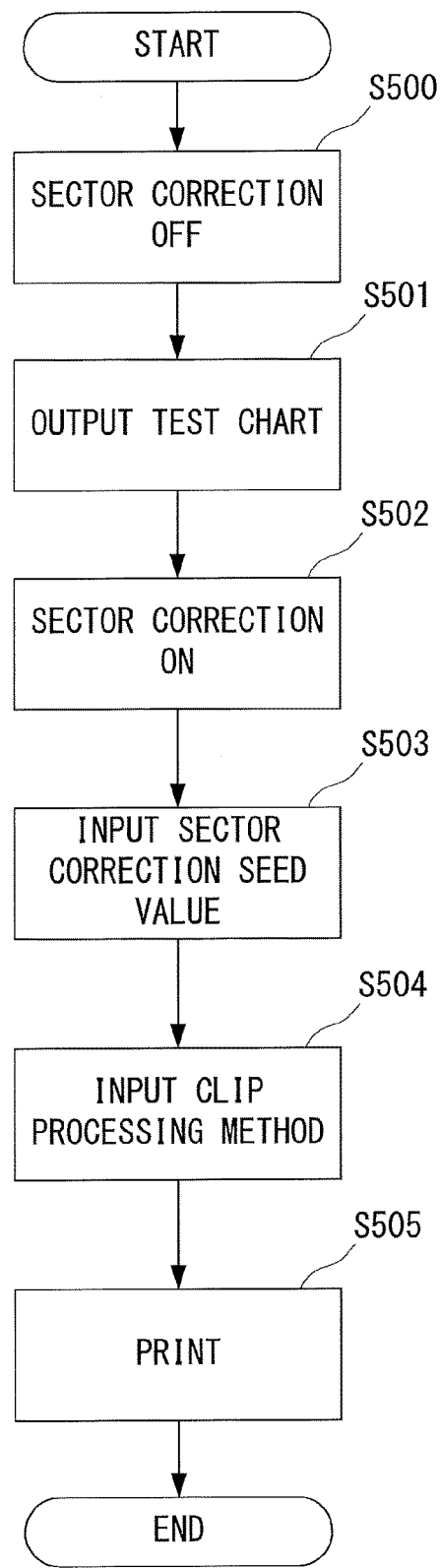
FIG. 4 is a flowchart illustrating an example of processing procedure of the image forming apparatus previously performed by a user.

FIG. 4 is a flowchart illustrating an example of setting procedure of the image forming apparatus 100 previously performed by a user for executing the sector correction processing. The user operates the image forming apparatus 100 via the host computer 1. The user sets, via the host computer 1, the sector correction processing not to be performed by the image processing unit 52 (S500). Thereby the sector correction is inhibited and, in this state, the image forming apparatus 52 can print a test image (test chart image). The test chart image is a reference image used to perform the sector correction. It may be a rectangular image where the lengths of two opposing sides are known. For example, suppose the sheet S is conveyed in the sub-scanning direction. The sides which are parallel in the sub-scanning direction are the two sides. Further, a direction which is vertical to the sub-scanning direction is the main scanning direction. Note that the test chart image is stored in advance, for example, in a storing unit (not shown) included in the host computer 1. The user operates the mode switch button 4 in the host computer 1 to select the sector correction seed value input mode. When the sector correction seed value input mode is selected, a sector correction seed value input screen X as shown in FIG. 5 is displayed on a display section 3 in the host computer 1.

The sector correction seed value input screen X comprises a check box, an input box a, and an input box b. In the check box, ON/OFF of the sector correction is specified. In the input box a, a left side length of the printed test chart image is input. In the input box b, a right side length of the printed test chart image is input. The sector correction seed value input screen X also comprises an input box C and an input box A. In the input box C, the length of the test chart image in the main scanning direction (main scanning length) is input. In the input box A, the length of test chart image in the sub-scanning direction (sub-scanning length) is input. To facilitate user's input operation, schematic diagrams are also shown on the sector correction seed value input screen X, with reference to the sheet output direction (sheet conveyance direction), below each input box. In the diagrams, each side a, b, A and C is associated with each input box a, b, C and A, which helps the user to easily input the measured value in the appropriate input box.

Figure 5:
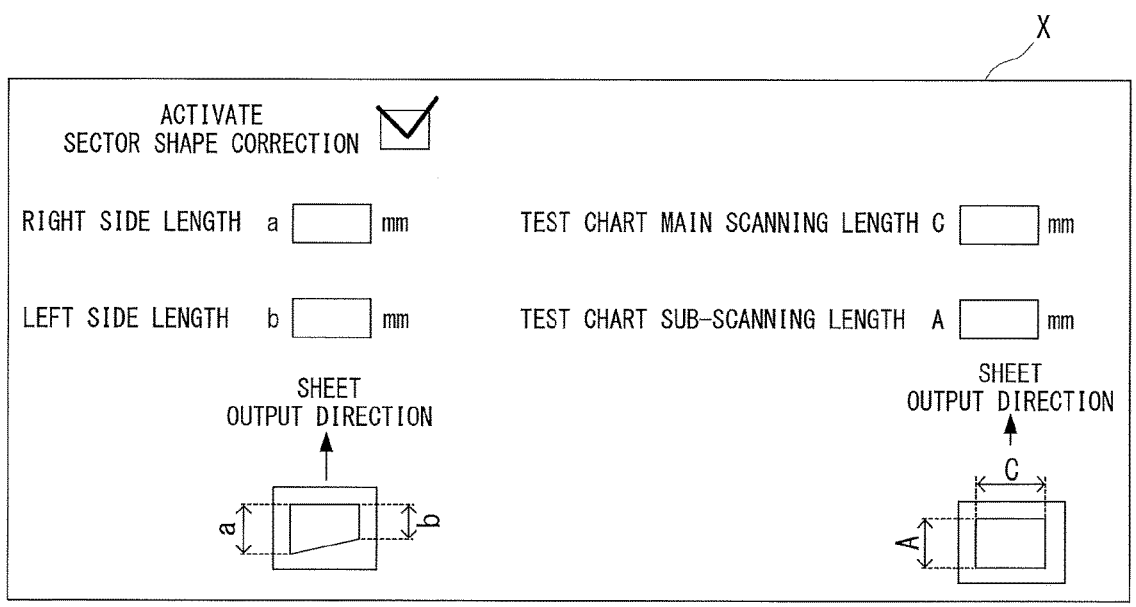
FIG. 5 is a diagram illustrating an example of a sector correction seed value input screen.

In the sector correction seed value input screen X shown in FIG. 5, a check box of an item "Activate sector correction" is checked. It means that the sector correction is ON. If it is unchecked, the sector correction ON/OFF signal, which is sent from the host computer 1 to the image processing unit 52, is turned OFF side.

Figure 6A:
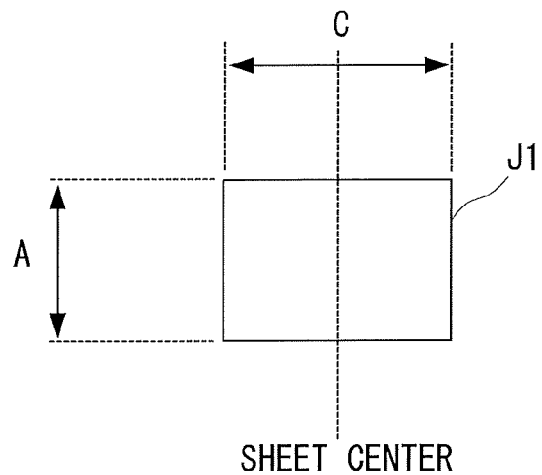
FIG. 6A is a diagram illustrating an example of a shape of a test chart image.
Figure 6B:
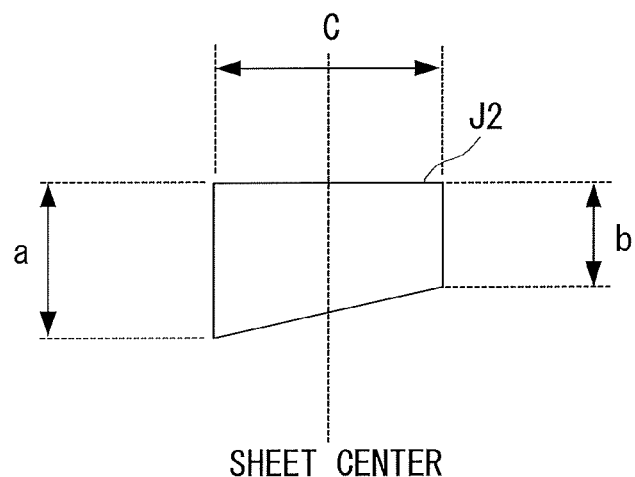
FIG. 6B is a diagram illustrating an example of a shape of a test chart image when printed by an image forming apparatus which causes a sector deformation.

With the check box is unchecked, the user instructs to print (output) the test chart image via the host computer 1 (S501). The user operates the mode switch button 4 in the host computer 1 to select the print mode. Then, the test chart image is instructed to start printing. It can be determined, according to the degree of deformation of the printed test chart image (degree of expansion and contraction), whether the sector deformation is caused in the image forming apparatus 100 in printing. Further, if the sector deformation is not caused in the image forming apparatus in printing, as shown in FIG. 6A, a rectangular image J1 (test chart image), which is symmetric with reference to a middle of the sheet (sheet center), is printed. The main scanning length of the test chart image of the image J1 is defined as "C". Similarly, the sub-scanning length of the image J1 is defined as "A". Further, the sector deformation is caused in the image forming apparatus in printing, even the same test chart image is printed, a distorted rectangular image J2, shown in FIG. 6B for example, is printed. Viewed from front of FIG. 6B, a left edge of the image J2, which is parallel in the sub-scanning direction is defined as a left side a. Also, a right edge of the image J2, which is parallel in the sub-scanning direction is defined as a right side b.

The user sets, via the host computer 1, such that, in the following printing, the sector correction processing is performed by the image processing unit 52 (S502). In particular, the user checks the check box of the item "Activate sector correction". Due to this, the sector correction ON/OFF signal, which is sent from the host computer 1 to the image processing unit 52, is turned ON side.

The user measures a length of the left side a of the image J2. Then, the user inputs the measured value in the input box a for "Left side length" displayed on the sector correction seed value input screen X. Also, the user measures a length of the right side b of the image J2. Then, the user inputs the measured value in the input box b for "Right side length" displayed on the sector correction seed value input screen X. Further, the user inputs a value "C", which is a value of the main scanning length of the test chart image, in the input box C for "Test chart main scanning length" displayed on the sector correction seed value input screen X. Also, the user inputs a value "A", which is a value of the sub-scanning length of the test chart image, to the input box A for "Test chart sub-scanning length" displayed on the sector correction seed value input screen X. These values as input are the sector correction seed values which act as seeds to derive the sector correction parameter. As above, the user inputs the sector correction seed value (S503). Note that, in the schematic diagram which is shown at the left side viewed from the front of the sector correction seed value input screen X, a sector, having the length of the left side a longer than the length of the right side b, is illustrated. This is an illustration to facilitate the user's input operation so that, in some cases, the length of the left side a to be measured is shorter than the length of the right side b to be measured.

The user operates the mode switch button 4 in the host computer 1 to select the clip processing input mode (S504). When the user selects the clip processing input mode, a sector correction seed value clip processing selection screen Y, as shown in FIG. 7, is displayed on the display section 3 in the host computer 1.

Figure 7:
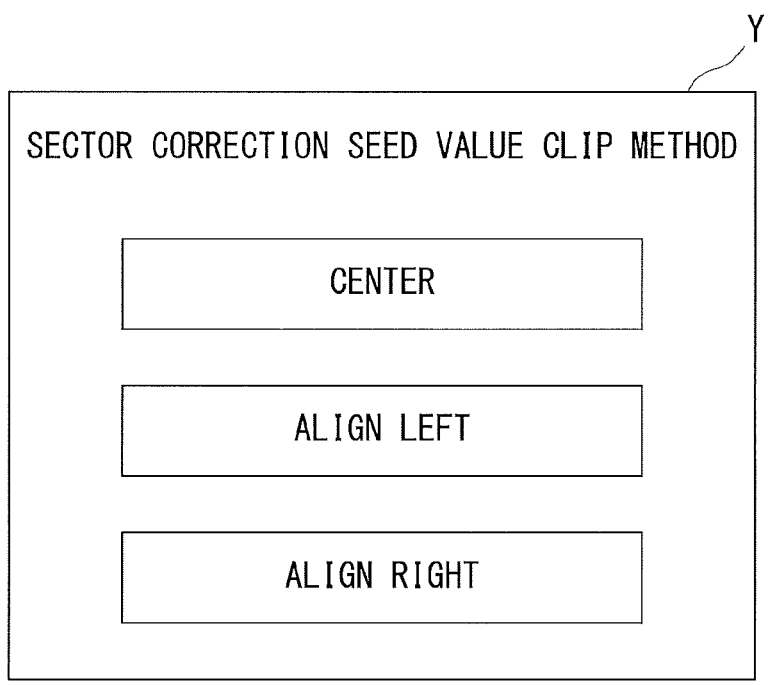
FIG. 7 is a diagram illustrating an example of a sector correction seed value clip processing selection screen.

The sector correction seed value clip processing selection screen Y shown in FIG. 7 is configured such that each clip processing including "Center", "Align Left", and "Align Right" is exclusively selected. The user selects one of the "Center", "Align Left", and "Align Right" to identify a type of clip processing (correction pattern) for correcting the sector correction parameter (S504). Following is the outline of each mode of the clip processing. In the "Center" clip processing, the sector correction parameter is corrected (adjusted) such that the length of the sub-scanning direction (image size) at the sheet center position remains the same before and after the correction. In the "Align Right" clip processing, the sector correction parameter is adjusted such that the length of the sub-scanning direction (image size) at the sheet right end remains the same before and after the correction. In the "Align Left" clip processing, the sector correction parameter is adjusted such that the length of the sub-scanning direction (image size) at the sheet left end remains the same before and after the correction. It means that, selecting the clip processing by the sector correction seed value clip processing selection screen Y shown in FIG. 7 means to select a reference position used for performing a distortion correction of the image. As above, in the "Align Left" and "Align Right" clip processing, either the left end or the right end of the image size of the sub-scanning direction remains the same before and after the correction. Therefore, the reference position used to correct the distortion is selected based on the user's instruction. Note that, the present embodiment is performed when the difference in length between the left side and the right side of the image data after the sector correction processing, that is, the difference between the max value and the minimum value of the length of the sub-scanning direction of the area is larger than the number of lines L in the line buffer 51. As above, the detail of the processing when exceeding the buffer size will be described later.

The user operates the mode switch button 4 of the host computer 1 to select the print mode (S505). Then, the image forming apparatus 100 is ready to start printing operation. Along with this, the CPU 50 derives the sector correction parameter of the entire image. In the following, the detail of how to derive the sector correction parameter is described.

Figure 8:
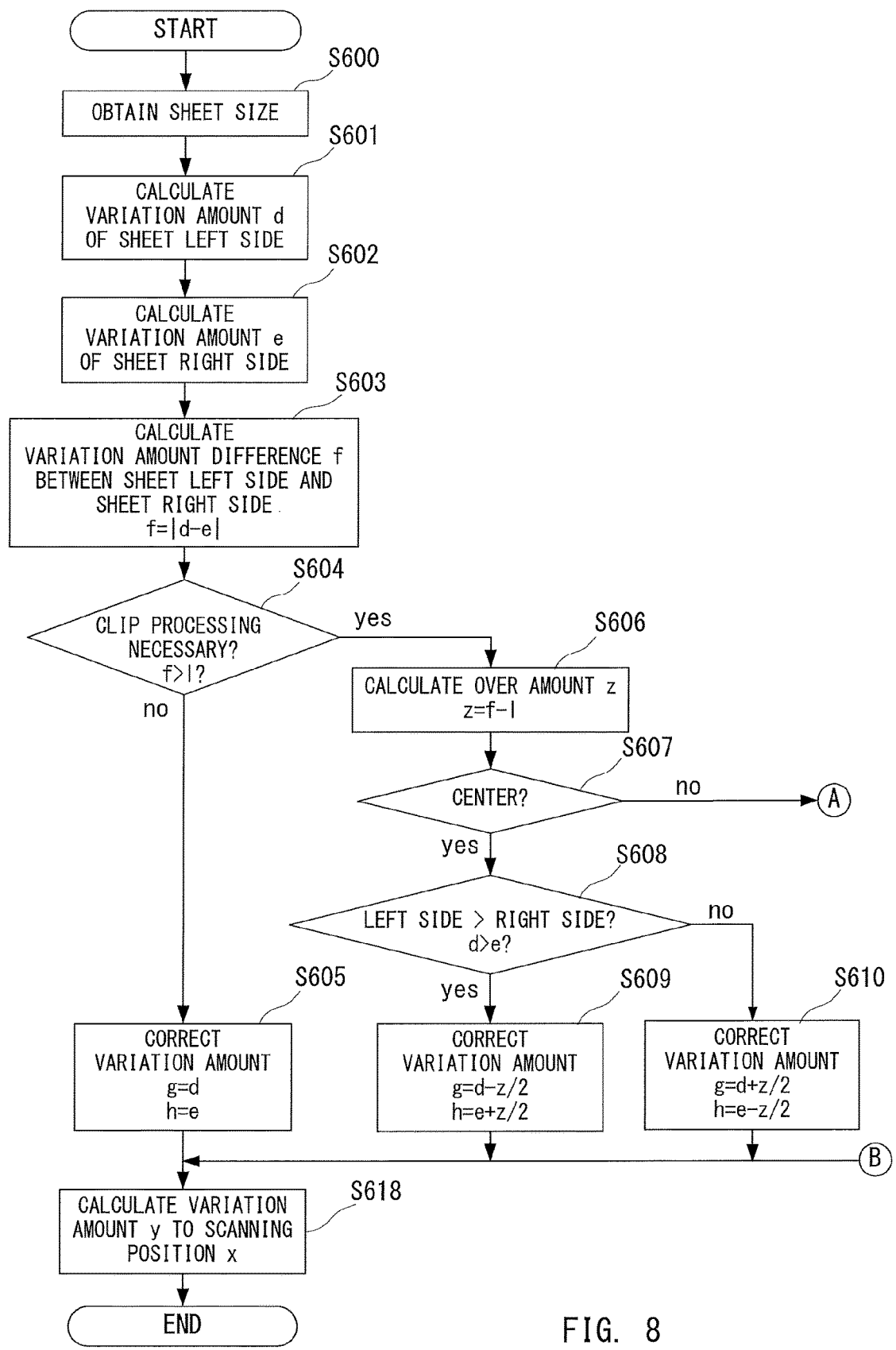
FIG. 8 is a flow chart illustrating a processing procedure of how to derive a sector correction parameter.
Figure 9:
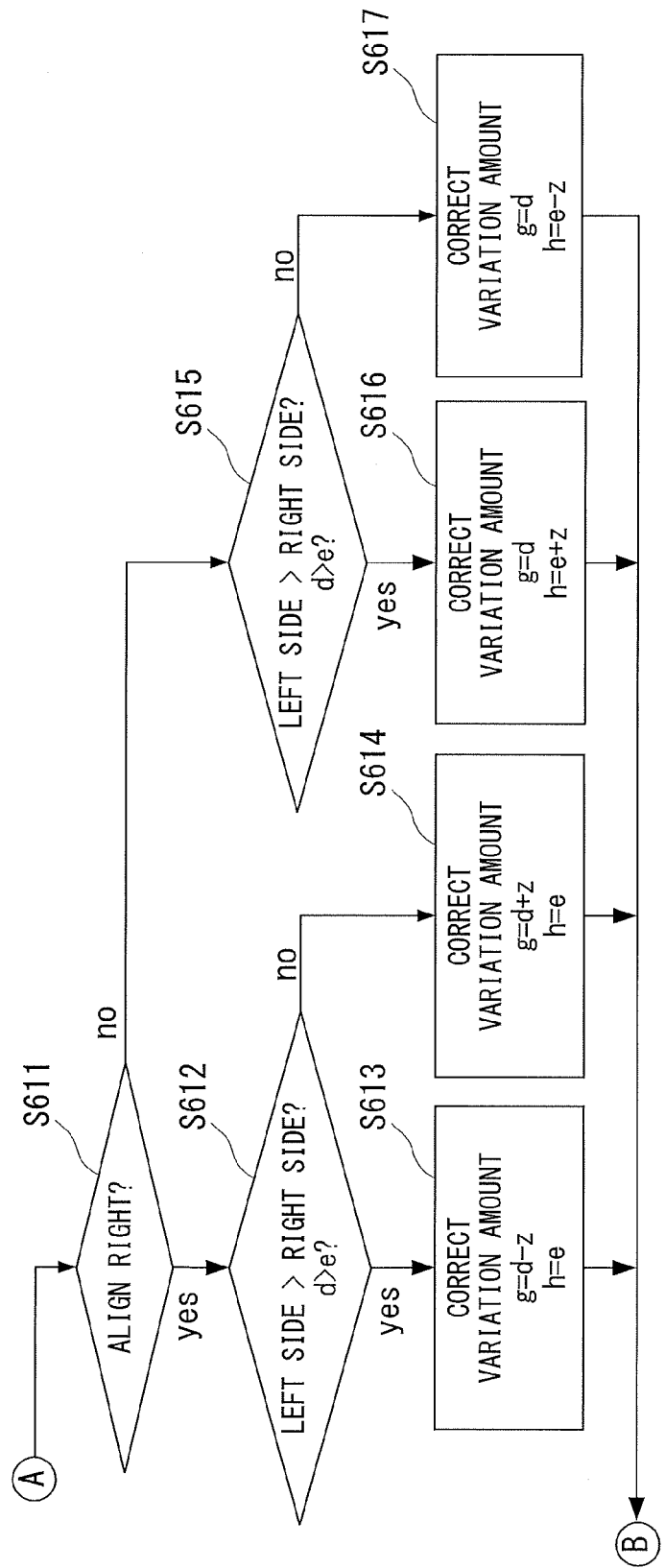
FIG. 9 is a flow chart illustrating a processing procedure of how to derive a sector correction parameter which follows FIG. 8.

FIGS. 8 and 9 are flow charts each illustrating a processing procedure of how to derive a sector correction parameter by the CPU 50. The CPU 50 obtains a size of the sheet used to print the image from the host computer 1 (S600). The length of the sheet of the main scanning direction is defined as "m", and that of the sub-scanning direction is defined as "n" in the following description. Further, a side to the left of the sheet in the sub-scanning direction is defined as a left side. Similarly, a side to the right of the sheet in the sub-scanning direction is defined as a right side. Note that the sheet size is, for example, A4 size, B4 size and the like, which are previously stored in a storing unit (not shown). The CPU 50 derives variation amount of the sheet left side (S601). For example, a center position of the photosensitive drum 102 is defined as a main scanning position "0", the sub-scanning length of the test chart image is defined as "A", and the main scanning direction of the test chart image is defined as "C". Further, a direction in which the respective length of the side a and the length of the side b are extended to the sub-scanning length A is defined as "positive". Similarly, a direction in which the respective length of the side a, and the length of the side b is reduced to the sub-scanning length A is defined as "negative". In this case, the variation amount of the side a of the sub-scanning direction at the main scanning position −2/C ("−" represents negative, and the same applies hereinafter) is expressed by "a−A". Further, the variation amount of the side b of the sub-scanning direction at the main scanning position +2/C ("+" represents positive, the same applies hereinafter) is expressed by "b−A". Therefore, the variation amount of the sub-scanning length at each main scanning position on the sheet is derived by performing linear interpolation using the two points, the main scanning position −2/C and the main scanning position +2/C. The variation amount y of the sub-scanning length at the main scanning position x is expressed by a following expression 1.

$$Y(x)=[((b-A)-(a-A))/C]*(x+C/2)+(a-A) \quad \text{expression 1}$$

The expression 1 is simplified into an expression 2 as follows.

$$y(x)=[(b-a)/C]*(x+C/2)+(a-A) \quad \text{(expression 2)}$$

Note that the variation amount shown in the expression 2 is for a side of the sub-scanning length A.

Based on the expression 2, the CPU 50 derives the variation amount d, which is the variation amount of the sub-scanning length at the sheet left side (main scanning position x=−m) (S601). The variation amount p, which is the variation amount of the sub-scanning direction of the left side of the test chart image, is obtained as follows: p=y(−m/2). Further, the variation amount is in proportion to the length of the original side. Therefore, the variation amount d of the sheet left side of the sub-scanning length n is obtained as follows: d=p*n/A.

The CPU 50 derives the variation amount e, which is the variation amount of the sub-scanning length at the sheet left side (main scanning position x=m) (S602). The variation amount q, which is the variation amount of the right side of the test chart image of the sub-scanning length, is obtained as follows: q=y(m/2). Further, the variation amount is in proportion to the length of the original side. Thus, the variation amount e, which is the variation amount of the sheet right side of the sub-scanning length n, is obtained as follows: e=q*n/A.

The CPU 50 derives difference between the variation amount of the sub-scanning length at the sheet left side and the variation amount of the sub-scanning direction at the sheet right side (S603). The variation amount difference f is obtained as follows: f=|d−e|. As above, the CPU 50 obtains information relating to the distortion of the image. The CPU 50 determines whether the clip processing is necessary or not (S604). In particular, the CPU 50 determines whether the variation amount difference f is larger than the number of lines L in the line buffer 51 or not. The unit of the number of lines L is the number of pixel lines. Therefore, the variation amount difference is compared with the number of lines L using line buffer amount 1, in which the number of lines L is converted into the unit [mm]. For example, the line buffer amount 1, in which the number of lines L is converted into the unit [mm] and an image resolution is 2400 [dpi], can be obtained as follows: l=L*(25.4/2400) (round down a decimal point). As a result of the comparison, if f>l, the size of the image data after the sector correction processing exceeds the size of the line buffer. In this case, the CPU 50 determines that the clip processing is necessary. If it is determined that the clip processing is necessary (S604: yes), the processing branches to the processing of Step S606. Further, if it is determined that the clip processing is not necessary (S604: no), the CPU 50 sets the variation amount g at the sheet left side and the variation amount h at the sheet right side as follows: g=d, h=e (S605).

The CPU 50 derives over amount z obtained by subtracting the line buffer amount 1 from the variation amount difference f (S606). Since the variation amount difference f is found f>1 and the clip processing is determined necessary (S604: yes), the over amount z takes a positive value. The CPU 50 obtains the reference position information, used to correct the distortion, selected based on the user's instruction. In particular, the CPU 50 determines whether or not the clip processing identified by the user in the step S504 (FIG. 4) is the "Center" (S607). If it is determined that the identified clip processing is the "Center" (S607: yes), the processing proceeds to Step S608. Further, if it is determined that the identified clip processing is not the "Center" (S607: no), the processing proceeds to Step S611.

Each processing in Steps S608, S609, and S610 is the processing in which the identified clip processing is the "Center". The CPU 50 determines which side, the left side or the right side, will be relatively longer after the sector correction (S608). In particular, the CPU 50 compares the variation amount d of the sheet left side with the variation amount e of the sheet right side. As a result of the comparison, if the variation amount d is found larger than the variation amount e (608: yes), the CPU 50 respectively corrects the variation amounts g of the sheet left side and the variation amount h of the sheet right side as follows: g=d−z/2; h=e+z/2 (S609). Further, if the variation amount e is found larger than the variation amount d (S608: no), the CPU 50 respectively corrects the variation amount g of the sheet left side and the variation amount h of the sheet right side as follows: g=d+z/2; h=e−z/2 (S610). In each processing in Step S609 and Step S610, the variation amount is corrected, in which the respective variation amounts of the sheet left side and the sheet right side are reduced by the same amount (z/2). This point is described using FIG. 10, in a case where the variation amount e is larger than the variation amount d, for example.

Figure 10A:
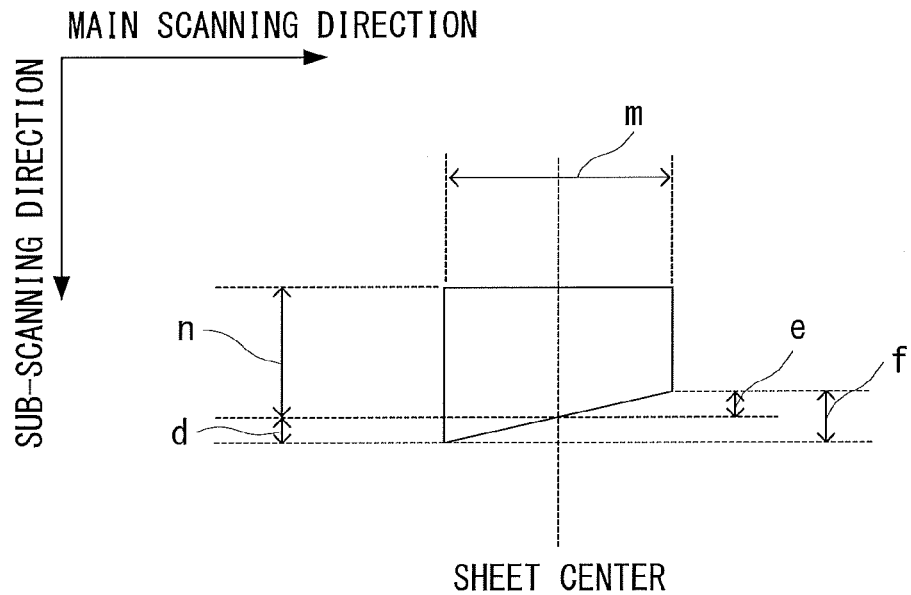
FIG. 10A is a diagram which schematically illustrates a shape of the image data after the sector correction when the sector correction is performed based on the sector correction seed value.
Figure 10B:
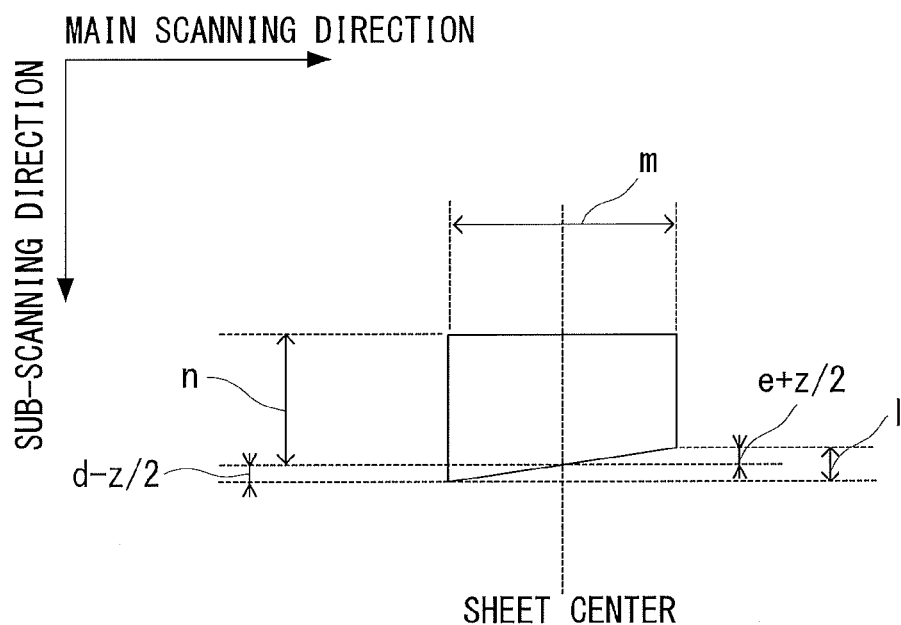
FIG. 10B is a diagram which schematically illustrates a shape of the image data after the sector correction when "Center" clip processing is performed.

FIG. 10A is a diagram schematically illustrating a shape of the image data after the sector correction when the clip processing is not performed. FIG. 10B is a diagram schematically illustrating a shape of the image data after the sector correction when the "Center" clip processing is performed. In principle, the image data shown in FIG. 10A is generated and the distortion by the sector deformation is cancelled. However, as previously mentioned, the variation amount difference f is larger than the line buffer amount 1. Thus, if the image is printed in this state, the defective image occurs. In the "Center" clip processing, as shown in FIG. 10B, the variation amount d and the variation amount e are respectively reduced by the same amount (z/2) such that the difference between the variation amount d and the variation amount e becomes equal to the line buffer amount 1. In doing so, occurrence of the defective image in printing is inhibited. In the "Center" clip processing, using the sheet center as a reference position, the position deviation of the left side and the right side of the printed image can be reduced. Therefore, the "Center" clip processing is suitable for balancing the whole image.

Back to FIG. 8, the CPU 50 determines whether or not the identified clip processing is the "Align Right". If it is determined that the identified clip processing is the "Align Right" (S611: yes), the CPU 50 proceeds to processing of Step S612. Further, if it is determined that the identified clip processing is not the "Align Right" (S611: no), the CPU 50 proceeds to processing of Step S615.

Each processing in steps S612, S613, and S614 is the processing in which the identified clip processing is the "Align Right". The CPU 50 determines which side, the left side or the right side, will be relatively longer after the sector correction (S612). In particular, the CPU 50 compares the variation amount d of the sheet left side with the variation amount e of the sheet right side. As a result of the comparison, if the variation amount d is found larger than the variation amount e (612: yes), the CPU 50 respectively corrects the variation amount g of the sheet left side and the variation amount h of the sheet right side as follows: g=d−z; h=e (S613). Further, if the variation amount e is found larger than the variation amount d (S612: no), the CPU 50 respectively corrects the variation amount g of the sheet left side and the variation amount h of the sheet right side as follows: g=d+z; h=e (S614). In each processing in Step S609 and Step S610, the variation amount is corrected, in which only the variation amount of the sheet left side is corrected. This point is described using FIG. 11, in a case where the variation amount d is larger than the variation amount e, for example.

Figure 11A:
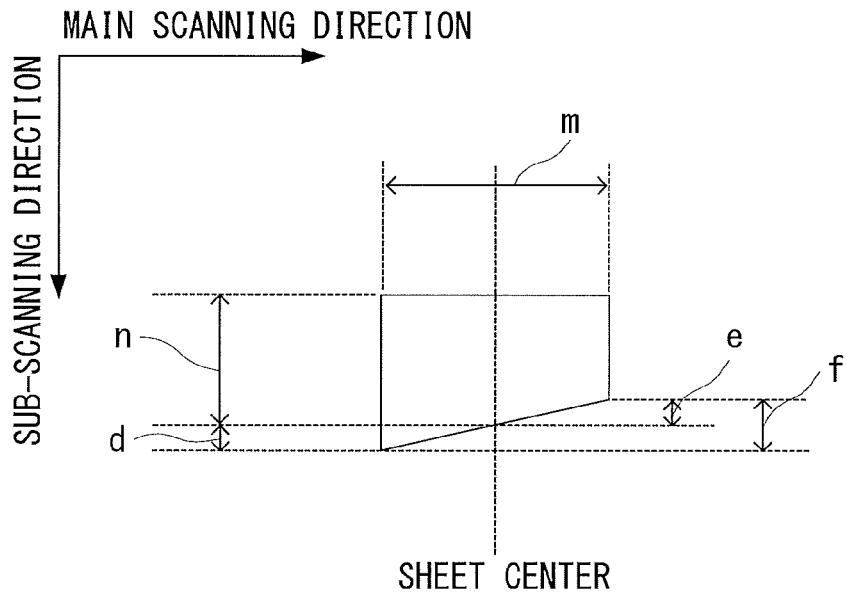
FIG. 11A is a diagram which schematically illustrates a shape of the image data after the sector correction when the sector correction is performed based on the sector correction seed value.
Figure 11B:
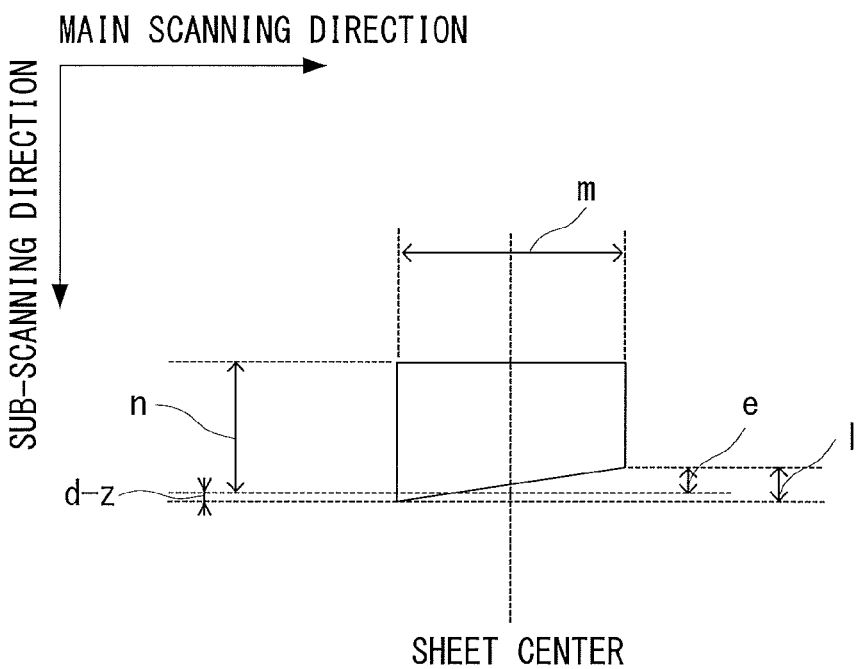
FIG. 11B is a diagram which schematically illustrates a shape of the image data after the sector correction when "Align Right" clip processing is performed.

FIG. 11A is a diagram schematically illustrating a shape of the image data after the sector correction when the clip processing is not performed. FIG. 11B is a diagram schematically illustrating a shape of the image data after the sector correction when the "Align Right" clip processing is performed. In principle, the image data shown in FIG. 11A is generated and the distortion by the sector deformation is cancelled. However, as previously mentioned, the variation amount difference f is larger than the line buffer amount 1. Therefore, if the image is printed in this state, the defective image occurs. In the "Align Right" clip processing, as shown in FIG. 11B, the variation amount d of the sheet left side is only reduced by the over amount z such that the difference between the variation amount d and the variation amount e becomes equal to the line buffer amount 1. Thus, occurrence of the defective image in printing is inhibited. In the "Align Right" clip processing, the length of the sub-scanning direction of the right side of the image becomes a reference. Therefore, in some printings, when opened, it is important that the sub-scanning positions of the right page and the left page exactly match with each other. In such printings, the "Align Right" clip processing is suitable for printing its left page.

Each processing in steps S615, S616, and S617 is the processing when the identified clip processing is the "Align Left". The CPU 50 determines which side, the left side or the right side, will be relatively longer after the sector correction (S615). In particular, the CPU 50 compares the variation amount d of the sheet left side with the variation amount e of the sheet right side. As a result of the comparison, if the variation amount d is found larger than the variation amount e (615: yes), the CPU 50 respectively corrects the variation amount g of the sheet left side and the variation amount h of the sheet right side as follows: g=d; h=e+z/2 (S616). Further, if the variation amount e is found larger than the variation amount d (S615: no), the CPU 50 respectively corrects the variation amount of the sheet left side and the variation amount h of the sheet right side as follows: g=d; h=e−z (S617). As a result, similar to the "Align Right" clip processing, occurrence of the defective image in printing is inhibited. Therefore, in some printings, when opened, it is important that the sub-scanning positions of the right page and the left page exactly match with each other. In such printings, the "Align Left" clip processing is suitable for printing its right page.

The CPU 50 derives variation amount y, which is the variation amount of the sub-scanning length at the main scanning position x (S618). In particular, variation amount is respectively derived for the following two situations: (1) when the main scanning position of sheet left side x=+m/2, length of sub-scanning direction n is corrected to g; and (2) when the main scanning position of sheet left side x=+m/2, length of sub-scanning direction n is corrected to h. Using the two points, the main scanning positions −m/2 and +m/2, linear interpolation is performed to derive the variation amount y. The variation amount y of the sub-scanning length to the main scanning position x is expressed by a following expression 3.

$$y(x)=[((g-n)-(h-n))/m]*(x+m/2)+(g-n) \quad \text{(expression 3)}$$

The expression 3 is simplified into an expression 4 as follows.

$$y(x)=[(g-h)/m]*(x+m/2)+(g-n) \quad \text{(expression 4)}$$

The CPU 50 converts the unit of the variation amount y of the sub-scanning length as derived into the pixel number and stores the converted pixel number in the sector correction parameter storing unit 58.

As above, a first correction condition or a second correction condition is stored in the sector correction parameter storing unit 58 as the sector correction parameter.

Figure 13A:
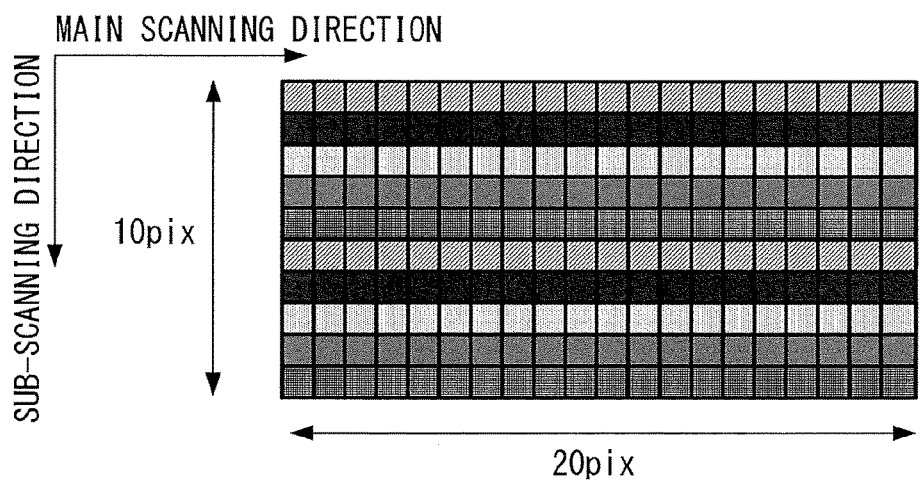
FIG. 13A is a diagram which schematically illustrates image data arranged with 12 pixels in a main scanning length and with 10 pixels in a sub-scanning length.
Figure 13B:
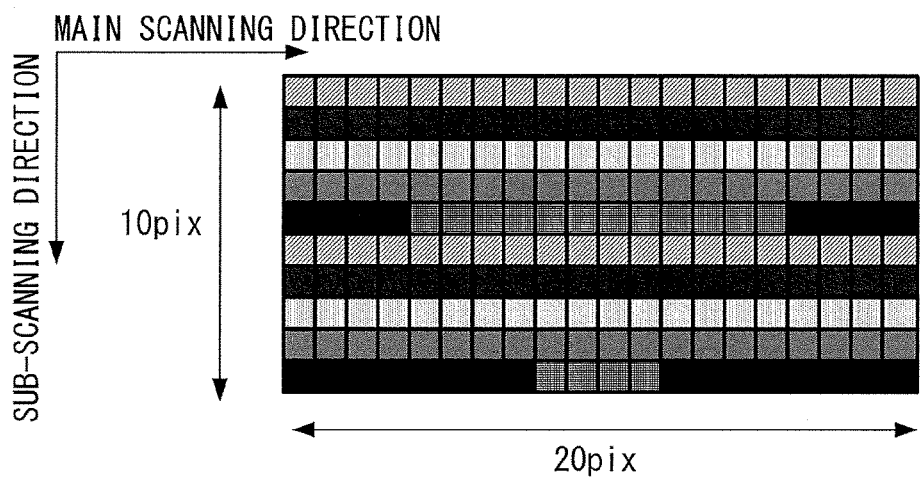
FIG. 13B is a diagram illustrating a state in which pixels subjected to be magnification processing is identified.
Figure 13C:
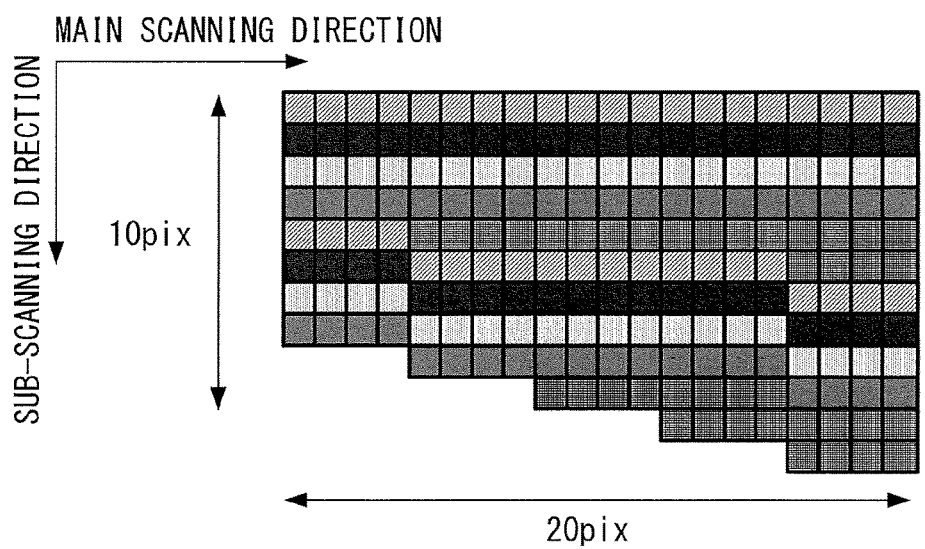
FIG. 13C is a diagram illustrating image data after the magnification processing is performed.
Figure 14:
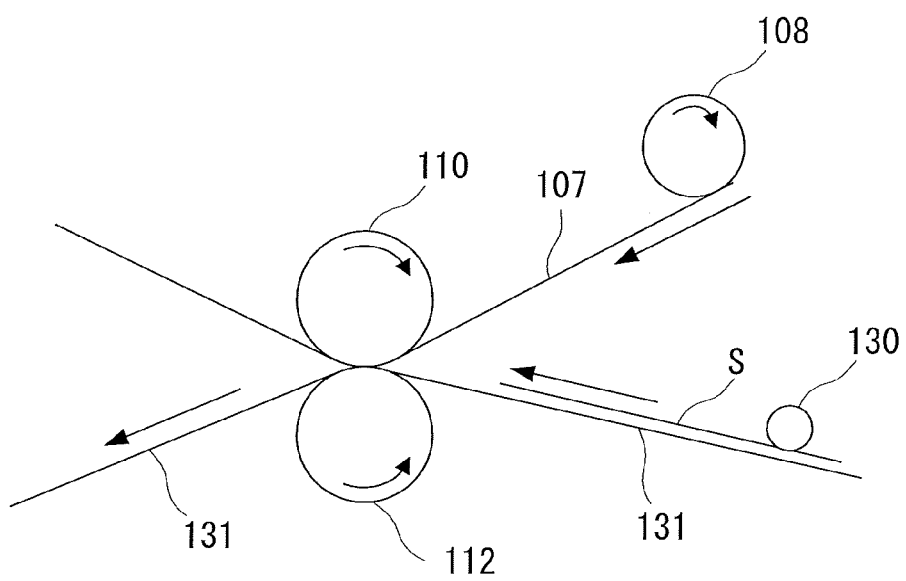
FIG. 14 is a diagram for explaining a secondary transfer mechanism.
Figure 15A:
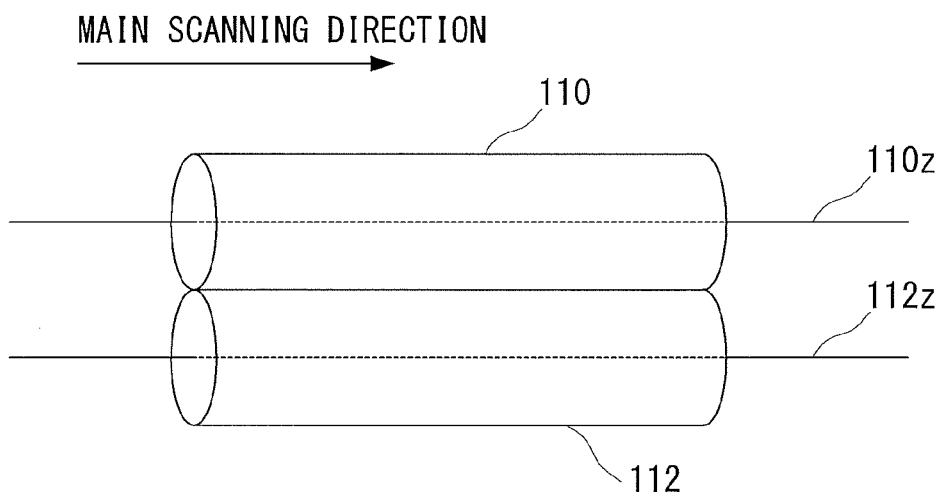
FIG. 15A is a diagram for explaining an arrangement of a driven roller and a secondary transfer roller when the intermediate transfer belt moves at the same speed at which a sheet is conveyed.
Figure 15B:
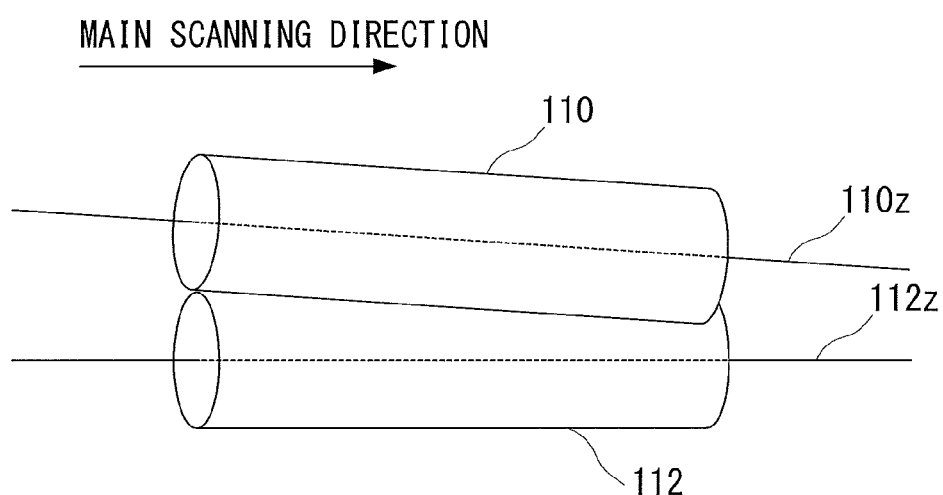
FIG. 15B is a diagram for explaining an arrangement of a driven roller and a secondary transfer roller when the intermediate transfer belt does not move at the same speed at which a sheet is conveyed.
Figure 16A:
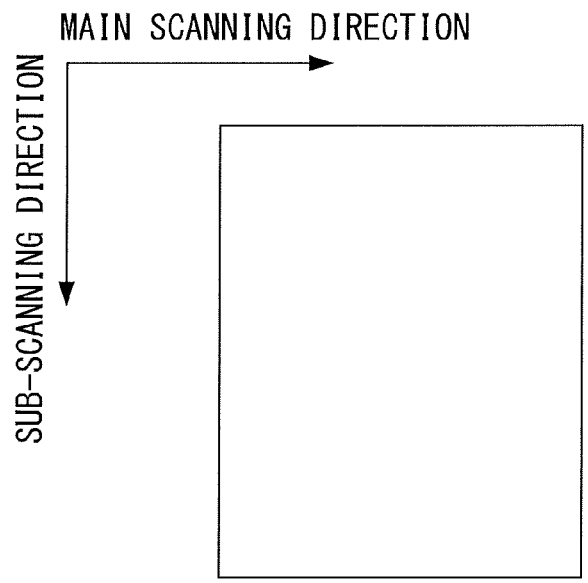
FIG. 16A is a diagram illustrating an example of image.
Figure 16B:
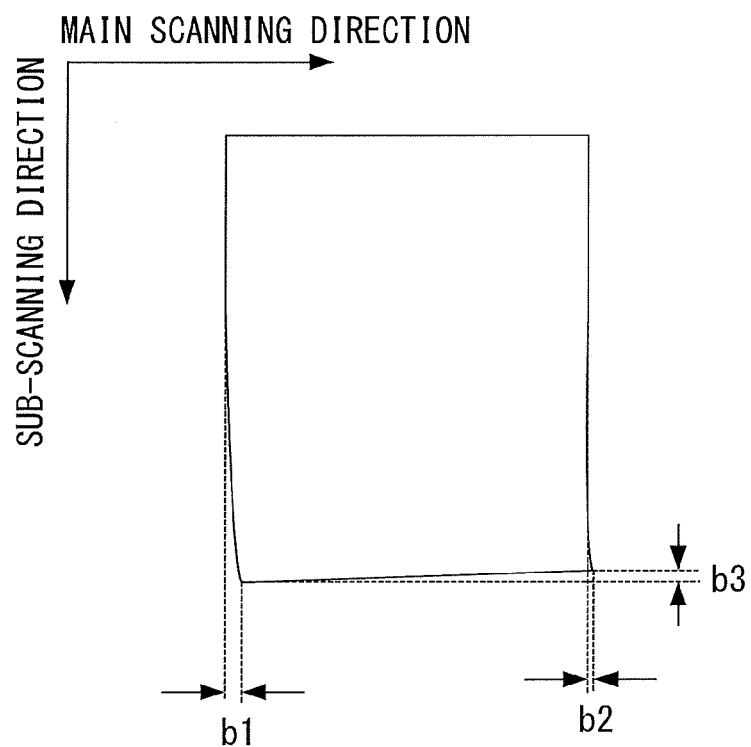
FIG. 16B is a diagram illustrating a situation where a shape of the image in FIG. 16A is printed in a distorted shape.
Figure 17A:
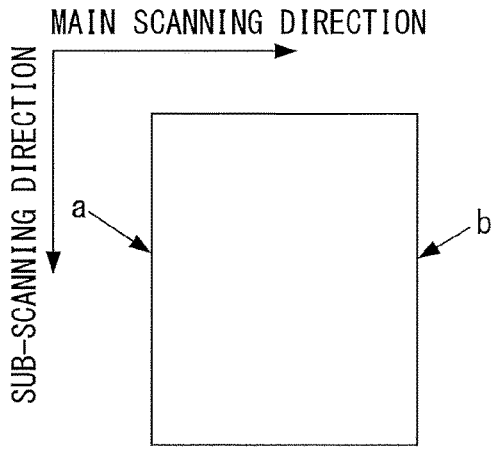
FIGS. 17A to 17E are diagrams for explaining a state in which the image data after the sector correction is too large to be stored in a memory.
Figure 17B:
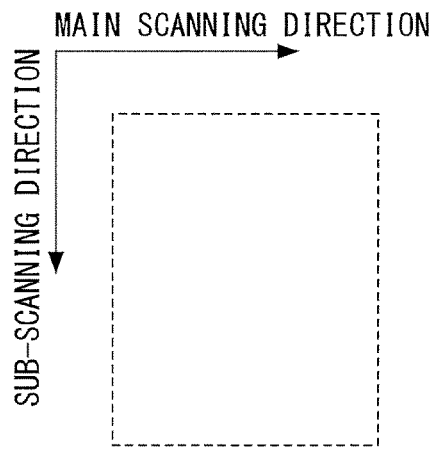
Figure 17C:
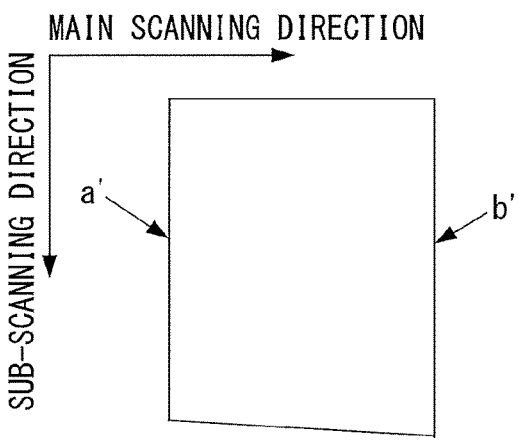
Figure 17D:
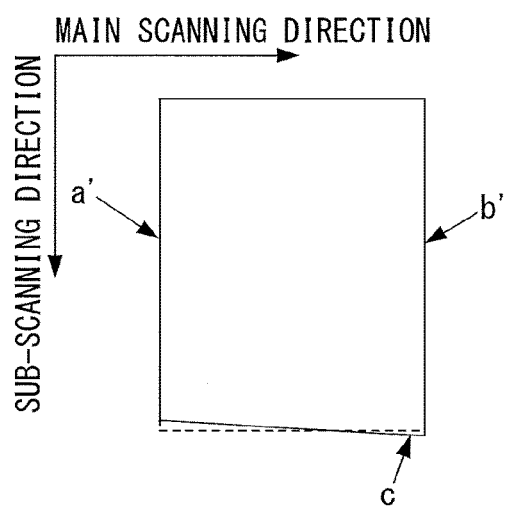
Figure 17E:
Figure 18:
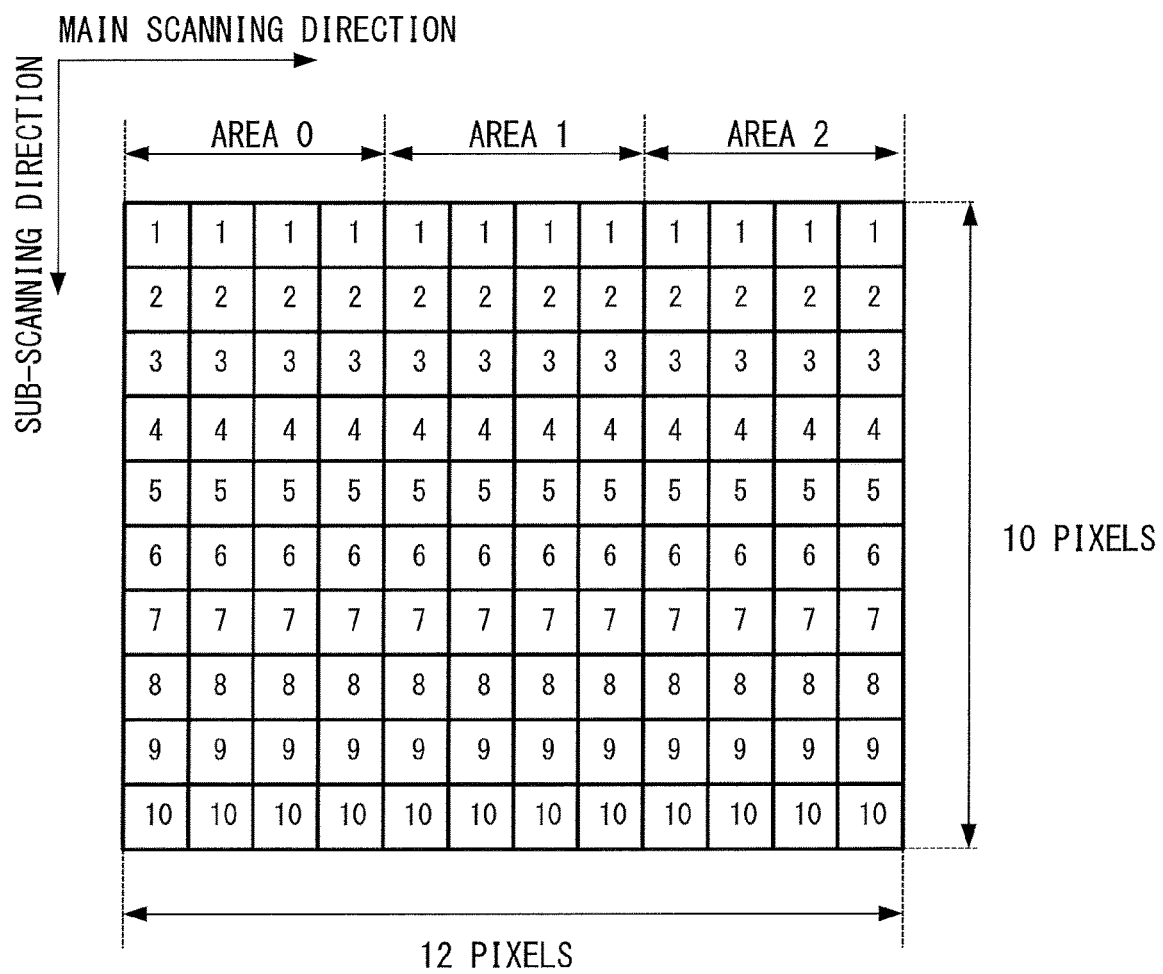
FIG. 18 is a diagram illustrating image data before the sector correction (original image data).
Figure 19:
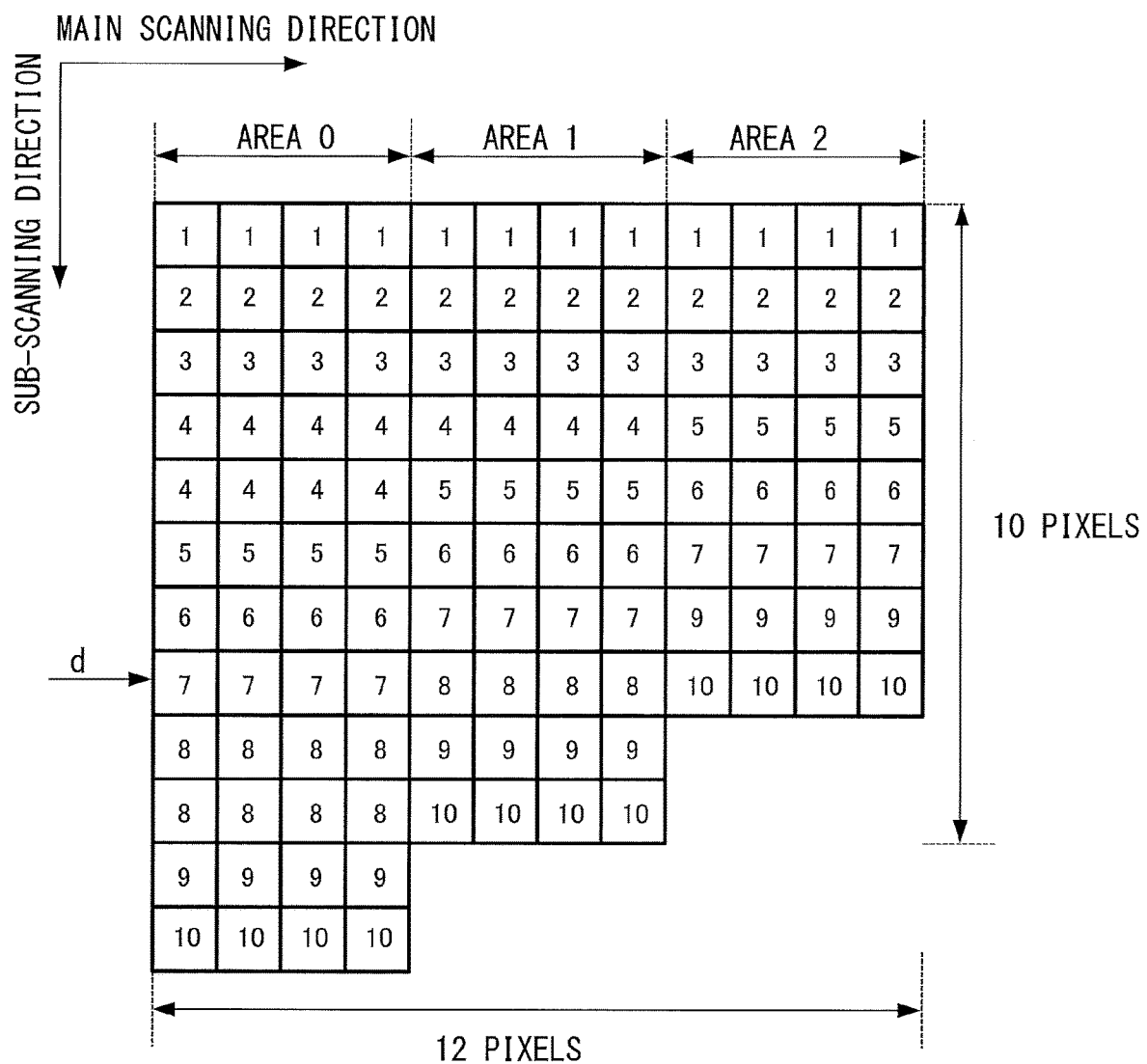
FIG. 19 is a diagram illustrating image data after magnification processing is performed.

Here, image processing by the image processing unit 52 is described. FIG. 12 is an example of the correction condition stored in the sector correction parameter storing unit 58. In the correction condition shown in FIG. 12, each correction value according to the main scanning position is defined. FIG. 13A is a diagram which schematically illustrates image data comprising the main scanning length of 20 pixels and the sub-scanning length of 10 pixels. The image processing unit 52 divides the image data into some areas, particularly, areas 0, 1 and 2. The area 0 is defined from the main scanning positions 0 to 3; the area 1, from the main scanning positions 4 to 7; and the area 2, from the main scanning positions 8 to 11 in the image data. Further, the image processing unit 52 divides the image data into areas 3 and 4. The area 3 is defined from the main scanning positions 12 to 15. The area 4 is defined from the main scanning positions 16 to 19. FIG. 13B is a diagram showing that, in the image data shown in FIG. 13A, pixels to perform the magnification processing are identified. FIG. 13C is the image data after the magnification processing based on the sector correction parameter. In the following, description is given as an example in a case where the image data input from the host computer 1 is the image data shown in FIG. 13A.

The image processing unit 52 identifies the pixel to perform the magnification processing for every divided area. In particular, the sub-scanning length is divided by an absolute value of the correction value (FIG. 12) for every area. Thereby, pixel to perform the magnification processing is identified. For example, in case of a zeroth (0) pixel of the main scanning position, the sub-scanning length of 10 pixels is divided by 2, which is the absolute value of the correction value. Then, one line for every five pixel is identified as the pixel to perform the magnification processing. Note that if the correction value is "0", it is deemed that the area has no pixel to perform the magnification processing. As a result, the pixel in all black shown in FIG. 13B is the pixel as identified to perform the magnification processing.

The image processing unit 52 performs the image processing to the pixel to perform the magnification processing. If the correction value (FIG. 12) is negative, the image processing unit 52 removes the target pixel close up the pixel by one line in the sub-scanning direction. Further, if the correction value is positive, the image processing unit 52 copies the target pixel in the sub-scanning direction to shift the pixel behind the copied pixel by one line in the sub-scanning direction. The image data shown in FIG. 13C represents the image data after performing the magnification processing to the areas 0 to 4.

As above, the image forming apparatus 100 of the present embodiment determines whether or not the size of the image data when performing distortion correction by the first correction condition based on the sector correction seed value exceeds the number of lines in the line buffer 51. If it is determined that it exceeds the number of lines, the second correction condition, in which the first condition is corrected, is derived, which is stored in the sector correction parameter storing unit 58. When the second correction condition is derived, the image processing unit 52 performs the image processing in which pixels are inserted to the position where is defined by the second correction condition, or pixels of the position are removed. Therefore, In doing so, occurrence of the defective image caused when the buffer consumption amount in the sector correction exceeds the previously estimated capacity. Further, the sector correction can be performed by the clip processing which is best suit to the user according to the purpose of use of the printings.

Note that, as an example of the clip processing which is user-selectable, description has been given with respect to "Center", "Align Left" and "Align Right" clip processing. Not limited to this, in the clip processing, according to the purpose of use of the printings, length of the sub-scanning direction at the specified main scanning position may be used as a reference. In this case, the user can specify the length of the sub-scanning direction at the main scanning position. Using the length as a reference, the clip processing can be performed. Further, in the description of the present embodiment, the image forming apparatus which performs the sector correction by the band processing has been described as an example, however, it is not limited to this. As an example, the present embodiment can be applied to the image forming apparatus which performs the sector correction by the frame processing. For example, it is determined whether the size of the image data when performing the distortion correction by the first correction condition based on the sector correction seed value exceeds the buffer (frame buffer) size. If it is determined that the size of the image data exceeds the buffer size, the second correction condition, in which the first correction condition is corrected, is derived. As above, it is possible to inhibit the occurrence of the defective image caused when a shortage of the line buffer occurs.

As above, according to the present disclosure, it is possible to inhibit the occurrence of the defective image caused when buffer consumption amount in the sector correction exceeds the previously estimated capacity. Further, based on the reference position used to correct the distortion, correction condition used for correction is derived from the information relating to the distortion of the image. This allows the user to optionally select the correction processing method.

The present invention has been described in detail by way of the above-mentioned embodiments, but the scope of the present invention is not limited to those embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077523, filed Apr. 4, 2014, which is hereby incorporated by reference herein in its entirety.

What is claimed is:

1. An image forming apparatus, comprising:
an image forming unit configured to form an image on a recording medium conveyed in a conveyance direction;
a line buffer configured to temporarily store image data of a predetermined number of lines;
a correction unit configured to perform magnification processing to the image data in a conveyance direction by controlling reading of image data from the line buffer based on a correction condition so that a distortion of a formed image is corrected;
an obtaining unit configured to obtain a first correction condition based on a test chart formed by the image forming unit;
a derivation unit configured to derive a second correction condition from the first correction condition in a case where the number of lines of the line buffer corresponding to the first correction condition exceeds the predetermined number of lines, wherein the number of the lines of the line buffer corresponding to the second correction condition does not exceed the predetermined number of lines,
wherein in a case in which the number of lines of the line buffer corresponding to the first correction condition does not exceed the predetermined number of lines, the correction unit controls the reading of the image data from the line buffer based on the first correction condition,
in a case in which the number of lines of the line buffer corresponding to the first correction condition exceeds the predetermined number of lines, the correction unit controls the reading of the image data from the line buffer based on the second correction condition, and
wherein a processor operates to function as the correction unit, the obtaining unit and the derivation unit.

2. The image forming apparatus according to claim 1, wherein
the second correction condition is a condition for defining a position at which a pixel is inserted or removed,
the correction unit is configured to perform the magnification processing by:
 (1) dividing the image data into a plurality of areas in a main-scanning direction perpendicular to the conveyance direction; and
 (2) inserting or removing a pixel at a position defined by the second correction condition for every divided area.

3. The image forming apparatus according to claim 2, wherein the derivation unit is further configured to derive the second correction condition in which a length at a second position remains the same before and after the correction, the length at the second position is a length in the sub-scanning direction at a left edge or a right edge in the main scanning direction.

4. The image forming apparatus according to claim 1, wherein the derivation unit is further configured to derive the second correction condition by:
 (1) selecting, by a user, one correction method from a plurality of correction methods; and
 (2) applying the correction method selected by the user to the first correction condition.

5. The image forming apparatus according to claim 4, wherein the correction method is a method in which a length at a first position remains the same even when distortion of the image is corrected by the correction unit, the length at the first position is a length in the sub-scanning direction at a center position in a main scanning direction in a case where the distortion of the image is corrected by the correction unit.

6. The image forming apparatus according to claim 4, wherein the correction method is a method in which a length at a second position remains the same even when distortion of the image is corrected by the correction unit, the length at the second position is a length in the sub-scanning direction at a left edge or a right edge in a main scanning direction in a case where the distortion of the image is corrected by the correction unit.

7. The image forming apparatus according to claim 4, wherein the correction method is a method in which a length at a third position remains the same even when distortion of the image is corrected by the correction unit, the length at the third position is a length in the sub-scanning direction at a position specified by a user in a main scanning direction in a case where the distortion of the image is corrected by the correction unit.

8. The image forming apparatus according to claim 1, wherein the derivation unit is further configured to derive the second correction condition from the first correction condition based on a clip method selected by the user.

9. The image forming apparatus according to claim 1, wherein the derivation unit is further configured to derive the second correction condition in which a length at a first position remains the same before and after the correction, the length at the first position is a length in a sub-scanning direction at a center position in a main scanning direction.

* * * * *